United States Patent
Crawford et al.

(10) Patent No.: US 12,388,772 B1
(45) Date of Patent: Aug. 12, 2025

(54) SYSTEMS AND METHODS FOR COOPERATIVE CHAT SYSTEMS

(71) Applicant: WELLS FARGO BANK, N.A., San Francisco, CA (US)

(72) Inventors: Jack C. Crawford, San Francisco, CA (US); Elizabeth Dellaha, San Francisco, CA (US); Apurva Hari, San Francisco, CA (US); Alicia Jones-McFadden, San Francisco, CA (US); Rungson Samroengraja, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 18/621,037

(22) Filed: Mar. 28, 2024

(51) Int. Cl.
*H04L 51/02* (2022.01)
*G06F 40/35* (2020.01)

(52) U.S. Cl.
CPC .............. *H04L 51/02* (2013.01); *G06F 40/35* (2020.01)

(58) Field of Classification Search
CPC ..... H04L 51/02; H04L 41/046; H04L 41/048; H04L 41/16; G06F 40/35; G06F 18/00; G06F 18/2132; G06N 20/00; G10L 15/00; G10L 15/02; G10L 15/063
See application file for complete search history.

(56) References Cited

U.S. PATENT DOCUMENTS

| | | | |
|---|---|---|---|
| 6,061,433 A * | 5/2000 | Polcyn | H04M 3/493 379/93.12 |
| 11,743,378 B1 | 8/2023 | Johnston et al. | |
| 2020/0005118 A1 | 1/2020 | Chen et al. | |
| 2021/0174372 A1 | 6/2021 | Jadhav et al. | |
| 2022/0101838 A1 | 3/2022 | George et al. | |
| 2025/0047665 A1* | 2/2025 | Patel | H04L 63/0861 |

OTHER PUBLICATIONS

[24]7.ai; AI and Humans: a Complex but Necessary Relationship, https://www.247.ai/; Jun. 24, 2022.
Gnani.ai; AI Chatbots in Banking Sector : Benefits & Future; https://www.gnani.ai/, Sep. 5, 2022.
Team Haptik; Chatbots for Wealth Management: Augmenting Wealth Using AI Technology; https://www.haptik.ai/blog/, Mar. 23, 2021.

* cited by examiner

*Primary Examiner* — Kostas J Katsikis
(74) *Attorney, Agent, or Firm* — Foley & Lardner LLP

(57) ABSTRACT

A system includes a processing circuit configured to receive a first input during a conversation. The processing circuit is further configured generate a first message parameter associated with the first input. The first message parameter corresponds with a first task that the processing circuit is authorized to autonomously perform. The processing circuit is further configured to autonomously perform the first task. The processing circuit is further configured to receive a second input from during the conversation. The processing circuit is further configured to generate a second message parameter associated with the second input. The second message parameter corresponds with a second task that the processing circuit is unauthorized to autonomously perform. The processing circuit is further configured to add a human agent device associated with a human agent to the conversation to provide a second response based on the second input and to perform the second task.

20 Claims, 8 Drawing Sheets

SYSTEMS AND METHODS FOR COOPERATIVE CHAT SYSTEMS

TECHNICAL FIELD

The present disclosure relates generally to seamless integration between an autonomous communication system and a human agent.

BACKGROUND

Typical customer service related communication systems are configured to enable a customer to communicate with and received assistance from one of a human agent or an automated agent.

SUMMARY

Some arrangements relate to a system. In some arrangements, the system includes a processing circuit. In some arrangements, the processing circuit includes memory and one or more processors. In some arrangements, the processing circuit is configured to receive a first input from a user device associated with a user during a conversation. In some arrangements, the processing circuit is also configured to model the first input to generate a first message parameter associated with the first input. In some arrangements, the first message parameter corresponds with a first task that the processing circuit is authorized to autonomously perform. In some arrangements, the processing circuit is also configured to autonomously perform the first task based on the first input. In some arrangements, the processing circuit is also configured to generate and provide, to the user device, a first response based on the first input. In some arrangements, the processing circuit is also configured to receive a second input from the user device during the conversation. In some arrangements, the processing circuit is also configured to model the second input to generate a second message parameter associated with the second input. In some arrangements, the second message parameter corresponds with a second task that the processing circuit is unauthorized to autonomously perform. In some arrangements, the processing circuit is also configured to add a human agent device associated with a human agent to the conversation to provide a second response based on the second input and to perform the second task. In some arrangements, the processing circuit is also configured to receive a third input from the user device during the conversation. In some arrangements, the processing circuit is also configured to model the third input to generate a third message parameter associated with the third input. In some arrangements, the third message parameter corresponds with a third task that the processing circuit is authorized to autonomously perform. In some arrangements, the processing circuit is also configured to autonomously perform the third task based on the third input. In some arrangements, the processing circuit is also configured to generate and provide, to the user device, a third response based on the third input.

Some arrangements relate to a method. In some arrangements, the method includes receiving, by a processing circuit, a first input from a user device associated with a user during a conversation. In some arrangements, the method also includes modeling the first input to generate a first message parameter associated with the first input. In some arrangements, the first message parameter corresponds with a first task that the processing circuit is authorized to autonomously perform. In some arrangements, the method also includes autonomously performing the first task based on the first input. In some arrangements, the method also includes generating and providing, to the user device, a first response based on the first input. In some arrangements, the method also includes receiving a second input from the user device during the conversation. In some arrangements, the method also includes modeling the second input to generate a second message parameter associated with the second input. In some arrangements, the second message parameter corresponds with a second task that the processing circuit is unauthorized to autonomously perform. In some arrangements, the method also includes adding a human agent device associated with a human agent to the conversation to provide a second response based on the second input and to perform the second task. In some arrangements, the method also includes receiving a third input from the user device during the conversation. In some arrangements, the method also includes modeling the third input to generate a third message parameter associated with the third input. In some arrangements, the third message parameter corresponds with a third task that the processing circuit is authorized to autonomously perform. In some arrangements, the method also includes autonomously performing the third task based on the third input. In some arrangements, the method also includes generating and providing, to the user device, a third response based on the third input.

Some arrangements relate to a computer-readable storage medium (CRM) having instructions stored thereon that, when executed by a processing circuit, cause the processing circuit to perform operations. The operations include receiving a first input from a user device associated with a user during a conversation. In some arrangements, the operations also include modeling the first input to generate a first message parameter associated with the first input. In some arrangements, the first message parameter corresponds with a first task that the processing circuit is authorized to autonomously perform. In some arrangements, the operations also include autonomously performing the first task based on the first input. In some arrangements, the operations also include generating and providing, to the user device, a first response based on the first input. In some arrangements, the operations also include receiving a second input from the user device during the conversation. In some arrangements, the operations also include modeling the second input to generate a second message parameter associated with the second input. In some arrangements, the second message parameter corresponds with a second task that the processing circuit is unauthorized to autonomously perform. In some arrangements, the operations also include adding a human agent device associated with a human agent to the conversation to provide a second response based on the second input and to perform the second task. In some arrangements, the operations also include receiving a third input from the user device during the conversation. In some arrangements, the operations also include modeling the third input to generate a third message parameter associated with the third input. In some arrangements, the third message parameter corresponds with a third task that the processing circuit is authorized to autonomously perform In some arrangements, the operations also include autonomously performing the third task based on the third input. In some arrangements, the operations also include generating and providing, to the user device, a third response based on the third input.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
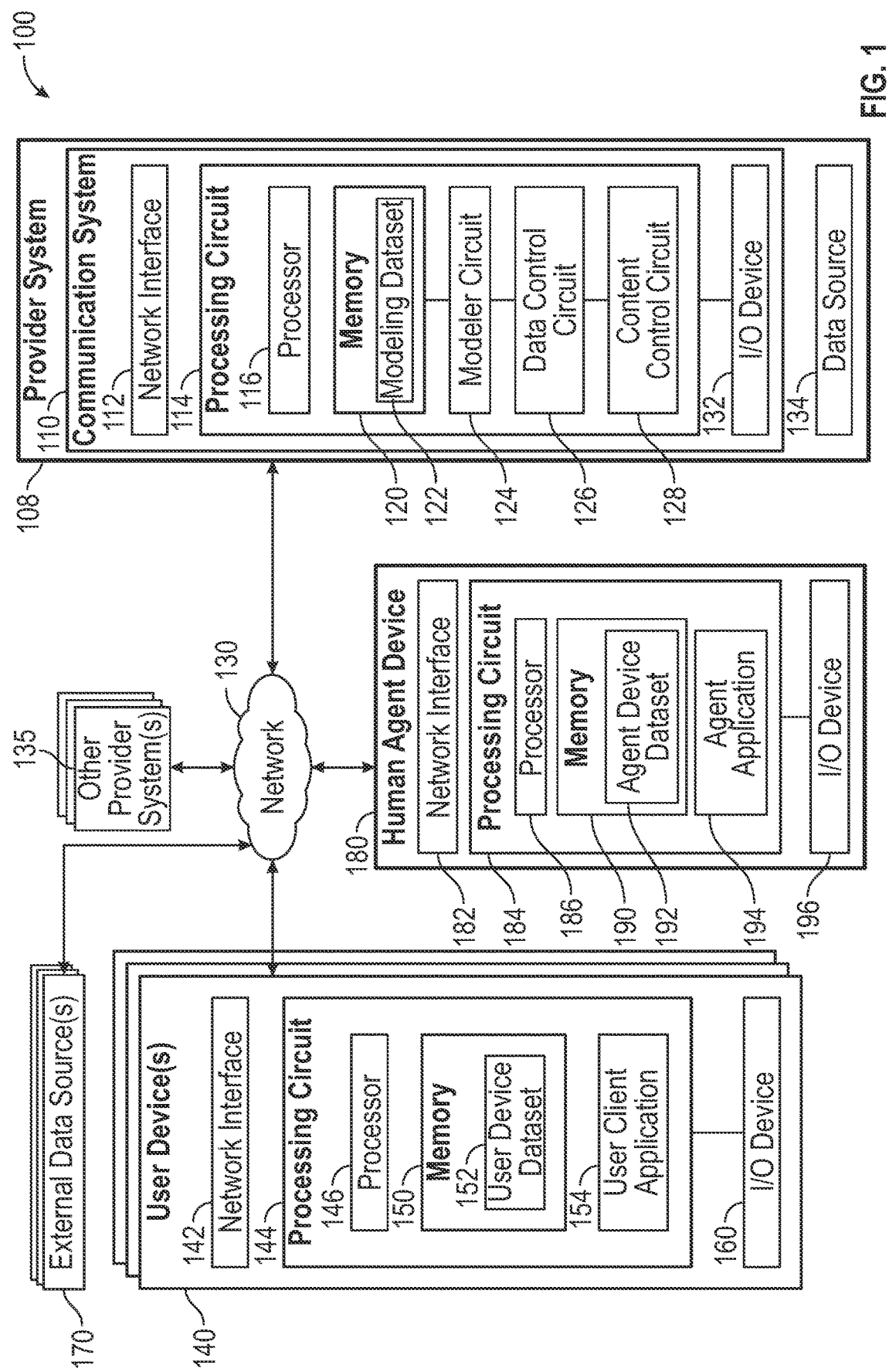
FIG. 1 is a block diagram of a computing environment including a communication system, according to example embodiments.

Referring generally to the figures, systems for a cooperative chat system are disclosed. In some embodiments, the system can receive inputs from a user device associated with a user during a conversation (e.g., a written conversation, an audio conversation, etc.) and allocate tasks and responses associated with the inputs between a processing circuit and a human agent according to various embodiments herein. In some instances, the system models the inputs received from the user device during the conversation to generate message parameters associated with each of the inputs. The message paraments may correspond with tasks that the processing circuit is authorized to autonomously perform or tasks that the processing circuit is unauthorized to autonomously perform. In some instances, the system includes the processing circuit autonomously performing the tasks that the processing circuit is authorized to autonomously perform and providing responses to the user device that are associated with the tasks that the processing circuit is authorized to autonomously perform. Additionally, in some instances, the system includes the processing circuit adding a human agent device associated with the human agent to the conversation to perform the tasks that the processing circuit is unauthorized to autonomously perform and provide responses to the user device that are associated with the tasks that the processing circuit is unauthorized to autonomously perform.

In some instances, the tasks that the processing circuit is authorized to autonomously perform are low authority tasks and the tasks that the processing circuit is unauthorized to autonomously perform are high authority task. In some instances, the system determines if the processing circuit is authorized or unauthorized to perform the tasks associated with the inputs based on a tone or sentiment associated with the inputs. In some instances, prior to adding the human agent device to the conversation, the system generates and provides a prompt to the human agent device based on the inputs associated with the tasks that the processing circuit is unauthorized to perform such that the human agent may review the prompt prior to the human agent device being added to the conversation.

In some instances, the system receives queries associated with the inputs associated with the tasks that the processing circuit is unauthorized to perform from the human agent device and provide responses to the queries to the human agent device. For example, the human agent may ask questions relating to the tasks that the processing circuit is unauthorized to perform from the human agent device and the processing circuit may provide responses that answer the questions. In some instances, the system provides notifications to the user device indicating if the responses provided to the user device are being autonomously generated by the processing circuit or provided by the human agent. In some instances, the system provides summaries of each of the tasks autonomously performed by the processing circuit and performed by the human agent to the user device based on the responses autonomously generated by the processing circuit and provided by the human agent.

Accordingly, the system described herein provides a variety of improvements over conventional communication systems. For example, during a conversation, conventional communication systems have not been configured to switch back and forth between autonomously performing tasks that the conventional communication systems are authorized to perform and adding a human agent to perform tasks that the conventional communication systems are unauthorized to perform. Instead, during a conversation, conventional communication systems typically autonomously perform tasks that the conventional communication systems are authorized to perform or the conventional communications systems typically require a human agent to perform tasks that an automated communication system is unauthorized to perform. As such, the human agent of a conventional system may be burdened with performing tasks that the conventional communication systems are authorized to perform. Further, even if all of the tasks that the conventional communication systems are authorized to perform are performed by the conventional communication systems, conventional communication systems are not configured to answer queries from the human agent regarding the tasks that the conventional communication systems are unauthorized to perform. As a result, the human agent may not be able to receive assistance while completing the tasks that the conventional communication systems are unauthorized to perform, which may result in the tasks that the conventional communication systems are unauthorized to perform being performed incorrectly or sub-optimally or otherwise inefficiently by the human agent.

The systems and methods described herein solve these issues by allowing the processing circuit to autonomously perform the tasks that the processing circuit is authorized to autonomously perform and adding the human agent to the conversation to perform the tasks that the processing circuit is unauthorized to autonomously perform. In some instances, the processing circuit may autonomously perform a first task that the processing circuit is authorized to autonomously perform during a conversation, add the human agent to the conversation to perform a second task that the processing circuit is unauthorized to autonomously perform, and then autonomously perform a third task that the processing circuit is authorized to autonomously perform during the conversation. Reducing the number of tasks that the human agent performs during a conversation may freeing up processing power of the communication system by allowing the processing circuit to quickly and efficiently perform tasks that may have otherwise been performed by the human agent. Additionally, reducing the number of tasks that the human agent performs during a conversation may decrease bandwidth on a network used by the communication system by reducing data transferred between the processing circuit and the human agent device during the tasks that may have otherwise been performed by the human agent. In some instances, the human agent may provide queries to the processing circuit regarding the tasks that the processing circuit is unauthorized to perform and the processing circuit may provide answers to the queries, such that the processing circuit may assist the human agent with the tasks that the processing circuit is unauthorized to perform. By answering the queries provided by the human agent, the processing circuit may further free up processing power of the communication system by efficiently providing the answers to the queries instead of the human agent manually searching for the answers through the communication system. Additionally, by answering the queries provided by the human agent, the processing circuit may further free up bandwidth on the network used by the communication system by reducing data transferred between the communication system and the human agent device when the human agent manually searches for answers through the communication system. In some instances, the processing circuit may initiate a hibernation mode or turn off after adding the human agent to the conversation and exit the hibernation mode or turn on after receiving an indication that the human agent has performed the second task. By entering the hibernation mode or turning off, the processing circuit may free up processing power of the communication system by reducing or eliminating the processing power allocated to the processing circuit and/or free up bandwidth of the network used by the communication system by reducing or eliminating the bandwidth required by the processing circuit.

Before turning to the figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

Referring to FIG. 1, a block diagram of a computing environment 100 including a provider system 108 is shown, according to potential embodiments. The provider system 108 is controlled by, managed by, owned by, and/or otherwise associated with a provider such as a bank, a credit union, an appraiser, a health care institution, a governmental institution, or other institutions (e.g., credit card companies, financial institutions (FI), insurance institutions, etc.). The computing environment 100 further includes one or more user devices (e.g., user device 140, human agent device 180), one or more other provider systems (e.g., external provider systems 135), and one or more external data sources (e.g., external data source 170). In some embodiments, the provider system 108, the user device 140, the human agent device 180, the external provider systems 135, and the external data source 170 are communicatively coupled. The various components of the computing environment 100 are in communication with each other and are connected by a network 130.

Although the various systems and devices are shown in FIG. 1 as being singular, it will be understood that, in some instances, the computing environment 100 includes one or multiple of any of the various illustrated systems and/or devices, as desired for a given application. Similarly, while the following descriptions of the various systems and devices are largely provided in terms of single systems or devices, it will be appreciated that these descriptions are similarly applicable to any additional corresponding systems and/or devices (e.g., additional of the external provider systems 135, additional of the user devices 140, and so on).

The provider system 108 includes a communication system 110 and a data source 134. The communication system 110 may be operated by the provider of the provider system 108, such as an entity, a consultant, a retailer, a service provider, and so on. The communication system 110 includes a network interface 112 and a processing circuit 114. In some instances, the communication system 110 may contain more or less components than are shown in FIG. 1 (e.g., at least one processing circuit, at least one data source, etc.). The network interface 112 connects the communication system 110 to the network 130. The network interface 112 facilitates secure communications between the communication system 110 and various other components of the computing environment 100. The network interface 112 also facilitates communication with other entities (e.g., the external provider systems 135, the external data source 170 etc.), such as other banks, healthcare systems, and so on. Further, in some arrangements, the network interface 112 includes cryptography capabilities to establish a secure or relatively secure communication session in which data communicated over the session is encrypted. In various instances, the network 130 may be wired network (e.g., via Ethernet), a wireless network (e.g., via Wi-Fi, Bluetooth), a satellite network (e.g., via GPS), a pre-configured network, an ad-hoc network, a LAN, a WAN, etc.

The processing circuit 114 includes a processor 116, a memory 120, a modeler circuit 124, a data control circuit 126, and a content control circuit 128. In other embodiments, the processing circuit 114 may contain more or less components than are shown in FIG. 1. The processor 116 may be implemented as one or more application specific integrated circuits (ASICs), field programmable gate arrays (FPGAs), a group of processing components, or other suitable electronic processing components. The memory 120 may be a device for storing data and/or computer code (e.g., a non-transitory computer-readable storage medium, etc.). The memory 120 may store data associated with a variety of application programs ran by the communication system 110. One such application may be to provide data to the modeler circuit 124, data control circuit 126, and content control circuit 128. The memory 120 can store a variety of data related to the modeler circuit 124 in a modeling dataset 122, which may be used by the modeler circuit 124 as discussed herein.

The modeler circuit 124 is structured or configured to perform a variety of the functionalities described herein. As will be described in detail below, with regard to FIG. 3, the modeler circuit is configured to receive inputs from the user device 140 associated with the user during the conversation and generate message parameters that correspond with tasks based on the inputs. As used herein, "message parameters" is used to refer to data, rules, and/or guidelines that may be used to determine if the processing circuit 114 is authorized to autonomously perform the tasks corresponding to the inputs or if the processing circuit 114 is unauthorized to autonomously perform the tasks corresponding to the inputs. For example, if a first task is a low authority task, a first message parameter corresponding to the first task may indicate that the processing circuit 114 is authorized to autonomously perform the first task. As another example, if a second task is a high authority task, a second message parameter corresponding to the third task may indicate that the processing circuit is unauthorized to perform the second task. In some instances, the modeler circuit 124 is configured to autonomously perform tasks associated with inputs that correspond with message parameters that indicate that the processing circuit 114 is authorized to autonomously perform the tasks. For example, if an input from the user device 140 corresponds with a task of checking an amount held by an account associated with the user of the user device 140 and a message parameter associated with the input indicates that the processing circuit 114 is authorized to autonomously perform the task, the modeler circuit 124 may autonomously check the amount held by the account associated with the user of the user device 140. In some instances, the modeler circuit 124 is configured to generate a response based on the first input to the user device 140. For example, if the input from the user device 140 corresponds with the task of checking the amount held by the account associated with the user of the user device and the message parameter associated with the input indicates that the processing circuit 114 is authorized to perform the task, the modeler circuit 124 may generate a response associated with the amount held by the account after checking the amount held by the account. The response may be provided to the user device 140 such that the user of the user device 140 may be made aware of the amount held by the account.

In some instances, the modeler circuit 124 is configured to add the human agent device 180 associated with a human agent to the conversation with the user of the user device 140. For example, if the processing circuit 114 is unauthorized to perform a task corresponding to a message parameter associated with an input received from the user device 140, the modeler circuit 124 may add the human agent device 180 to the conversation such that the human agent may perform the task and generate a response based on the input to the user device 140. In some instances, after the modeler circuit 124 has added the human agent device 180 to the conversation, the modeler circuit 124 is configured to receive an additional input from the user device 140 during the conversation, model the additional input to generate an additional message parameter corresponding with an additional task that the processing circuit 114 is authorized to perform, autonomously perform the additional task based on the additional input, and generate an addition response based on the additional input to the user device 140. As a result, the human agent associated with human agent device 180 may not have to perform the additional task and generate the additional response after the human agent device 180 has been added to the conversation based on the processing circuit 114 being authorized to perform the additional task.

As will similarly be described below, in some instances, the modeler circuit 124 is further configured to generate a prompt based on an input to the human agent device 180 prior to adding the human agent device 180. For example, the prompt based on an input relating to opening a bank account may include a link to a resource that the human agent associated with the human agent device 180 may need to access to open the bank account. As another example, the prompt based on an input relating to applying for a loan may include actions that the processing circuit 114 would perform to apply for the loan. In some instances, the modeler circuit 124 is further configured to receive a query associated with an input from the human agent device 180, generate a query response to the query associated with the input. For example, the human agent associated with the human agent device 180 may ask the processing circuit 114 a question relating to steps associated with opening an account and the modeler circuit 124 may determine a response to the question. The response may be provided to the human agent device 180 such that the human agent is provided with the response and may continue with performing tasks and providing responses to the user device 140. In some instances, the modeler circuit 124 is configured to generate notifications that may be provided to the user device 140 to alert the user of the user device 140 if the responses provided to the user device 140 were generated autonomously by the processing circuit 114 or provided by the human agent associated with the human agent device 180. In some instances, the modeler circuit 124 is configured to generate a summary of the tasks autonomously completed by the processing circuit 114 and completed by the human agent associated with the human agent device 180 based on the responses generated by the processing circuit 114 and provided by the human agent. The summary may be provided to the user device 140 such that the user may quickly review the actions that were performed during the conversation.

The data control circuit 126 is configured to fuse data, including operations to generate various data structures stored in the memory 120 and used by the various circuits described herein. The data control circuit 126 can also be configured to receive data from multiple sources (e.g., the data source 134, the external data source 170, the external provider systems 135, the user devices 140, etc.) and aggregate the data into various data structures stored in the memory 120.

The content control circuit 128 is configured to generate content for displaying to users. The content can be selected from various resources (e.g., a request for an image related to completing a task from the data control circuit 126). The content control circuit 128 can also be structured to provide content (e.g., via a graphical user interface (GUI)) to the user device 140 over the network 130, for display. The content can also include actionable items that the user may select or otherwise manipulate. The content can be selected from various resources (e.g., from the data control circuit 126, from the memory 120, etc.).

The content generated by the content control circuit 128 can include customized dashboards, such as those described in detail below, with reference to FIGS. 4-8. The content control circuit 128 can generate customized user-interactive dashboards for one or more entities, such as the user device 140 and/or the human agent device 180, based on data received from the user device 140, the data source 134, the external data source 170, the human agent device 180 and/or any other computing device described therein. The generated dashboards can include various data (e.g., data stored in the content control circuit 128 and/or modeling dataset 122) associated with one or more tasks such as actions, photographs or videos, descriptions, and/or others. In certain embodiments, the communication system 110 includes an application programming interface (API) and/or a software development kit (SDK) that facilitate the integration of other applications with the communication system 110. For example, the communication system 110 is configured to utilize the functionality of the user device 140 interacting through an API.

The content control circuit 128 can generate an interface corresponding to the response data and/or task data (e.g., generated by the modeler circuit 124). In some instances, the interface may include elements indicating responses based on inputs received from a user device associated with a user during a conversation. For example, the interface may include text associated with a response based on an input received from the user device associated with the user during the conversation. The text may include a summary of a task that was performed based on the input. In some instances, the content control circuit 128 can generate an agent interface corresponding to query data (e.g., generated by the modeler circuit 124). In some instances, the agent interface may include elements indicating responses to queries received from the human agent device 180 associated with a human agent relating to the inputs received from the user device during the conversation. For example, the agent interface may include an image indicating relationships between accounts of a user based on receiving a query from the human agent device 180 regarding the image indicating the relationships between the accounts of the user.

The input/output device 132 is structured to receive communications from and provide communications to users associated with the communication system 110. The input/output device 132 can be structured to exchange data, communications, instructions, etc. with an input/output component of the communication system 110 (e.g., a mouse, a monitor, a keyboard, etc.). As such, the input/output device 132 may provide an interface for the user to interact with various applications stored on the communication system 110.

The data source 134 can provide data to the communication system 110. In some arrangements, the data source 134 can be structured to collect data from the communication system 110. In some instances, the communication system 110 may request data associated with specific data stored in the data source 134. In some instances, the data source 134 stores data related to the provider of the provider system 108. For example, if the provider is a bank, the data source 134 can store information relating to the accounts of customers of the bank.

The user device 140 is owned, operated, controlled, and/or otherwise associated with a user. The user device 140 may be or may include, for example, a desktop or laptop computer (e.g., a tablet computer), a smartphone, a wearable device (e.g., a smartwatch), a personal digital assistant, and/or any other suitable computing device. The user devices 140 may each include at least one of a network interface 142, at least one of a processing circuit 144, and at least one of an input/output device 160 (among potentially other components and/or systems). In some instances, the user associated with the user device 140 is a customer of the provider institution of the provider system 108 and may have one or more accounts maintained with the provider institution of the provider system 108. In various instances, the user associated with the user device 140 is a customer of the additional provider institutions of the external provider systems 135 and may have one or more accounts maintained with the additional provider institutions of the external provider systems 135. The network interface 142 couples the user device 140 to the network 130. The network interface 142 may be configured to enable communications with the network 130 and/or other computing systems. In various illustrative arrangements, any type of networking configuration may be achieved using network interface 142, such as wired (e.g., via Ethernet), wireless (e.g., via Wi-Fi, Bluetooth), satellite (e.g., via GPS) pre-configured, ad-hoc, LAN, WAN.

The processing circuit 144 includes a processor 146, a memory 150, and a user client application 154. In other embodiments, the processing circuit 144 may contain more or less components than are shown in FIG. 1. The processor 146 may be implemented as one or more application specific integrated circuits (ASICs), field programmable gate arrays (FPGAs), a group of processing components, or other suitable electronic processing components. The memory 150 may be a device for storing data and/or computer code. The memory 150 may store data associated with a variety of application programs ran by the communication system 110. One such application may be to provide data or information to the user client application 154. The variety of application programs and associated data may be stored as user device dataset 152.

The input/output device 160 can include any type of biometric sensor, touch screen, cursor control, such as a mouse, a trackball, or cursor direction keys, for communicating direction information and command selections to the processor 146 and for controlling cursor movement on the display of the user device 140.

Additionally, processing circuit 144 of each of the user devices 140 may each store, in the memory 150, and execute ("run") the user client application 154. The user client application 154 may be provided by and at least partially supported by the provider system 108 and be configured to enable the various functionality described herein. For example, in some instances, the user client application 154 may be a financial institution banking application provided by a bank that is associated with the provider system 108.

In some instances, the user client applications 154 comprise a provider client application provided by and at least partly supported by the provider system 108 and configured to enable various functionality described herein. In stances, the user client applications 154 comprises multiple provider client applications provided by and at least partly supported by the provider system 108 and configured to enable various functionality described herein based on a role of the person associated with the user device 140. For example, if the user device 140 is associated with a user having a conversation with the communication system 110, the user client applications 154 may include a user provider client application configured to allow for the user of the user device 140 to hold the conversation with the communication system 110.

In some instances, the user client application 154 is additionally coupled to various components within the computing environment 100 (e.g., the communication system 110, the provider system 108, the external provider system 135) via one or more application programming interfaces (APIs) and/or software development kits (SDKs) to integrate one or more features or services provided by the various components to enable the various methods and operations described herein. For example, in some instances, a provider client application provided to the user device 140 by the communication system 110 implements various functionality of the provider system 108 via one or more APIs and/or SDKs to allow for various functionality and/or information provided and/or stored by the provider system 108 to be utilized or otherwise implemented within the context of the provider client application.

Additionally, in some instances, the user client application 154 is configured to output information to a display of the user device 140 regarding information received from the communication system 110. For example, the user client application 154 may be configured to communicate with a user interface to show graphics regarding content associated with a response provided by the communication system 110 such as a photograph, or a video, or a description. Further, a user response to a display of user device 140 regarding information from the communication system 110 can send a message, task, or instruction to the communication system 110 via the network 130 that allows for the modeling dataset 122, modeler circuit 124, data control circuit 126, and/or content control circuit 128 to be perform an update.

In some instances, the user client application 154 is configured to output information to an audio output interface of the user device 140 regarding information received from the communication system 110. For example, the user client application 154 may be configured to communicate with a speaker of the user device 140 to provide an audio output from the speaker of the user device 140 associated with a response provided by the communication system 110 such as a description. In some instances, the user client application 154 is configured to output an audio file received from the communication system 110 to the audio output interface of the user device 140. In other instances, the user client application 154 is configured to generate an audio output based on information received from the communication system 110 and provide the audio output to the audio output interface of the user device 140 (e.g., using a text to speech program, etc.).

If the user device 140 is associated with a human agent related to the communication system 110, the user client applications 154 may include an agent provider client application configured to allow for the human agent to provide responses and perform actions based on inputs received from users during conversations with the communication system 110.

The human agent device 180 is owned, operated, controlled, and/or otherwise associated with a human agent. Similar to the user device 140, the human agent device 180 may be or may include, for example, a desktop or laptop computer (e.g., a tablet computer), a smartphone, a wearable device (e.g., a smartwatch), a personal digital assistant, and/or any other suitable computing device. The human agent device 180 may each include at least one of a network interface 182, at least one of a processing circuit 184, and at least one of an input/output device 196 (among potentially other components and/or systems). In some instances, the human agent is associated with the provider of the provider system 108 and may have an agent account associated with the provider of the provider system 108. For example, the human agent may be an employee or a contractor of the provider who is hired to assist users with completing tasks associated with the provider and the human agent may have an account associated with the provider that allows the human agent to log-in to the human agent device 180. The network interface 182 couples the human agent device 180 to the network 130. The network interface 182 may be configured to enable communications with the network 130 and/or other computing systems. In various illustrative arrangements, any type of networking configuration may be achieved using network interface 182, such as wired (e.g., via Ethernet), wireless (e.g., via Wi-Fi, Bluetooth), satellite (e.g., via GPS) pre-configured, ad-hoc, LAN, WAN.

The processing circuit 184 includes a processor 186, a memory 190 and an agent application 194. In other embodiments, the processing circuit 184 may contain more or less components than are shown in FIG. 1. The processor 186 may be implemented as one or more application specific integrated circuits (ASICs), field programmable gate arrays (FPGAs), a group of processing components, or other suitable electronic processing components. The memory 190 may be a device for storing data and/or computer code. The memory 190 may store data associated with a variety of application programs ran by the communication system 110. One such application may be to provide data or information to the agent application 194. The variety of application programs and associated data may be stored as agent device dataset 192.

The input/output device 196 can include any type of biometric sensor, touch screen, cursor control, such as a mouse, a trackball, or cursor direction keys, for communicating direction information and command selections to the processor 186 and for controlling cursor movement on the display of the human agent device 180.

Additionally, the processing circuit 184 of the human agent device 180 may store, in the memory 190, and execute ("run") the agent application 194. The agent application 194 may be provided by and at least partially supported by the provider system 108 and be configured to enable the various functionality described herein. For example, in some instances, the agent application 194 may be a customer support application provided by a bank that is associated with the provider system 108.

In some instances, the agent application 194 is additionally coupled to various components within the computing environment 100 (e.g., the communication system 110, the external provider system 135) via one or more application programming interfaces (APIs) and/or software development kits (SDKs) to integrate one or more features or services provided by the various components to enable the various methods and operations described herein. For example, in some instances, the agent application 194 provided to the human agent device 180 by the communication system 110 implements various functionality of the external provider system 135 via one or more APIs and/or SDKs to allow for various functionality and/or information provided and/or stored by the external provider system 135 to be utilized or otherwise implemented within the context of the agent application 194.

Additionally, the agent application 194 is configured to generate and provide or output information through the human agent device 180 regarding information received from the communication system 110. In some instances, the agent application 194 is configured to generate and provide an agent interface to a display of the human agent device 180. For example, the agent application 194 may be configured to communicate with a display device of the human agent device 180 to show the agent interface including content associated with inputs received by the processing circuit 114 from the user device 140. In other embodiments, the agent application 194 is configured to generate and provide an agent audio interface to the audio output device of the agent application 194. Further, a human agent response to the output of information through the human agent device 180 can send a message, a response, or a query to the communication system 110 via the network 130 that allows for modeling dataset 122, modeler circuit 124, data control circuit 126, and/or content control circuit 128 to perform an action (e.g., generate a query response to the query, generate a summary of the response, etc.). In some instances, the agent application 194 of the human agent device 180 may provide responses to the user client application 154 of the user device 140. For example, a human agent associated with the human agent device 180 may use the agent application 194 to provide a response to the user client application 154 of the user device 140 based on an input received from the user device 140 during a conversation.

In some instances, the human agent device 190 and/or the user device 140 may add the processing circuit 114 to a conversation between the human agent associated with the human agent device 190 and the user associated with the user device 140 to provide a response to an input received from the user device 140 of the human agent device 190 during the conversation. In some embodiments, the processing circuit 114 is configured to model the input to generate a message parameter associated with the input. The message parameter may correspond with a task that the processing circuit 114 is authorized to autonomously perform and the processing circuit 114 may autonomously perform the task based on the input. For example, during a conversation between the human agent and the user, the human agent device 180 may receive an input from the user device 140 that the human agent desires for the processing circuit 114 to handle (e.g., the processing circuit 114 is better suited to handle the input, the human agent does not know how to handle the input, etc.). The human agent may add the processing circuit 114 to the conversation between the human agent and the user via the human agent device 180 to provide the response to the input received from the user device and, in some instances, perform a task based on the input.

In some instances, if the human agent and the user are having a face to face conversation (e.g., a conversation at a location operated by the provider of the provider system 108, etc.), at least one of the human agent or the user may add the processing circuit 114 to the conversation and the processing circuit 114 may participate in the conversation via at least one of the human agent device 180 or the user device 140. For example, if the human agent and the user are having the face to face conversation and the human agent and the user do not speak the same language, the human agent may add the processing circuit to the conversation via the human agent device 180 and the processing circuit 114 may participate in the conversation via the human agent device 180 by translating the inputs received from the user and/or the human agent to at least one of the human agent device 180 or the user device 140. In some instances, the processing circuit 114 may receive user inputs from the user device 140 in a first language (e.g., a first language spoken by the user, etc.), translate the user inputs into a second language (e.g., a second language spoken by the human agent, etc.), and provide the user inputs in the second language to the human agent device 180 such that the human agent is provided with the user inputs in a language understood by the human agent. In some instances, the processing circuit 114 may receive human agent inputs from the human agent device 180 in the second language, translate the human agent inputs into the first language, and provide the human agent inputs in the first language to the user device 140 such that the user is provided with the human agent inputs in a language understood by the user.

The external data sources 170 can provide data to the provider system 108, the human agent device 180, and/or user device 140. In some arrangements, the external data sources 170 can be structured to collect data from other devices on network 130 (e.g., the user devices 140 and/or other third-party devices) and relay the collected data to the provider system 108 and/or user device 140. In some embodiments, the communication system 110 may request data associated with specific data stored in the data source (e.g., the data source 134, the external data sources 170). For example, in some arrangements, the external data sources 170 can support a search or discovery engine for Internet-connected devices.

With reference again to FIG. 1, the external provider system 135 is controlled by, managed by, owned by, and/or otherwise associated with an external provider, such as a bank, a credit union, an appraiser, a health care institution, a governmental institution, or other institutions (e.g., credit card companies, financial institutions (FI), insurance institutions, etc.) that is different from the provider associated with the provider system 108. In some embodiments, the external provider system 135 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures. In some instances, the external provider system 135 includes and/or has various other devices communicably coupled thereto, such as, for example, desktop or laptop computers (e.g., tablet computers), smartphones, wearable devices (e.g., smartwatches), and/or other suitable devices.

Figure 2:
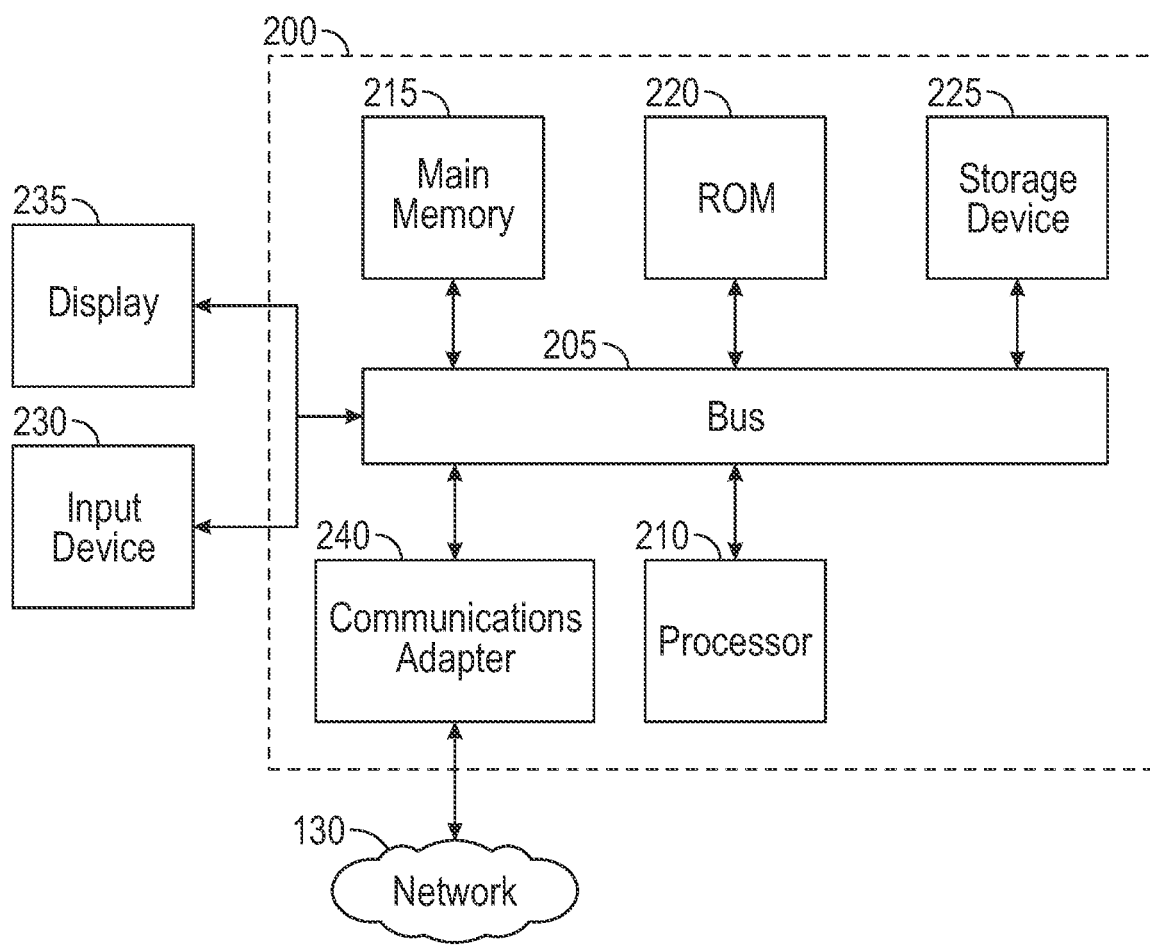
FIG. 2 is a block diagram illustrating an example computing system suitable for use in the example embodiments described herein.

Referring now to FIG. 2, a depiction of a computing system 200 is shown. The computing system 200 can be used, for example, to implement at least one of the computing environment 100, the provider system 108, the external provider systems 135, the user devices 140, the external data sources 170, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 may further include a read only memory (ROM) 220 or other static storage device coupled to the bus 205 for storing static information and instructions for the processor 210. A storage device 225, such as a solid-state device, magnetic disk, or optical disk, is coupled to the bus 205 for persistently storing information and instructions.

The computing system 200 may be coupled via the bus 205 to a display 235, such as a liquid crystal display, or active matrix display, for displaying information to a user. An input device 230, such as a keyboard including alphanumeric and other keys, may be coupled to the bus 205 for communicating information, and command selections to the processor 210. In some arrangements, the display 235 of the input device 230 has a touch screen. The input device 230 can include any type of biometric sensor, a cursor control, such as a mouse, a trackball, or cursor direction keys, for communicating direction information and command selections to the processor 210 and for controlling cursor movement on the display 235.

In some arrangements, the computing system 200 may include a communications adapter 240, such as a networking adapter. Communications adapter 240 may be coupled to bus 205 and may be configured to enable communications with the network 130 and/or other computing systems. In various illustrative arrangements, any type of networking configuration may be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement may also be employed to execute the instructions contained in main memory 215. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 2, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some arrangements, the computing system 200 may include virtualized systems and/or system resources. For example, in some arrangements, the computing system 200 may be a virtual switch, virtual router, virtual host, or virtual server. In various arrangements, computing system 200 may share physical storage, hardware, and other resources with other virtual machines. In some arrangements, virtual resources of the network 130 (e.g., network 130 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.).

With an example structure of the computing environment 100 being described above, example processes performable by the computing environment 100 (or components/systems thereof) will be described below. It should be appreciated that the following processes are provided as examples and are in no way meant to be limiting. Additionally, various method steps discussed herein may be performed in a different order or, in some instances, completely omitted. These variations have been contemplated and are within the scope of the present disclosure.

Figure 3:
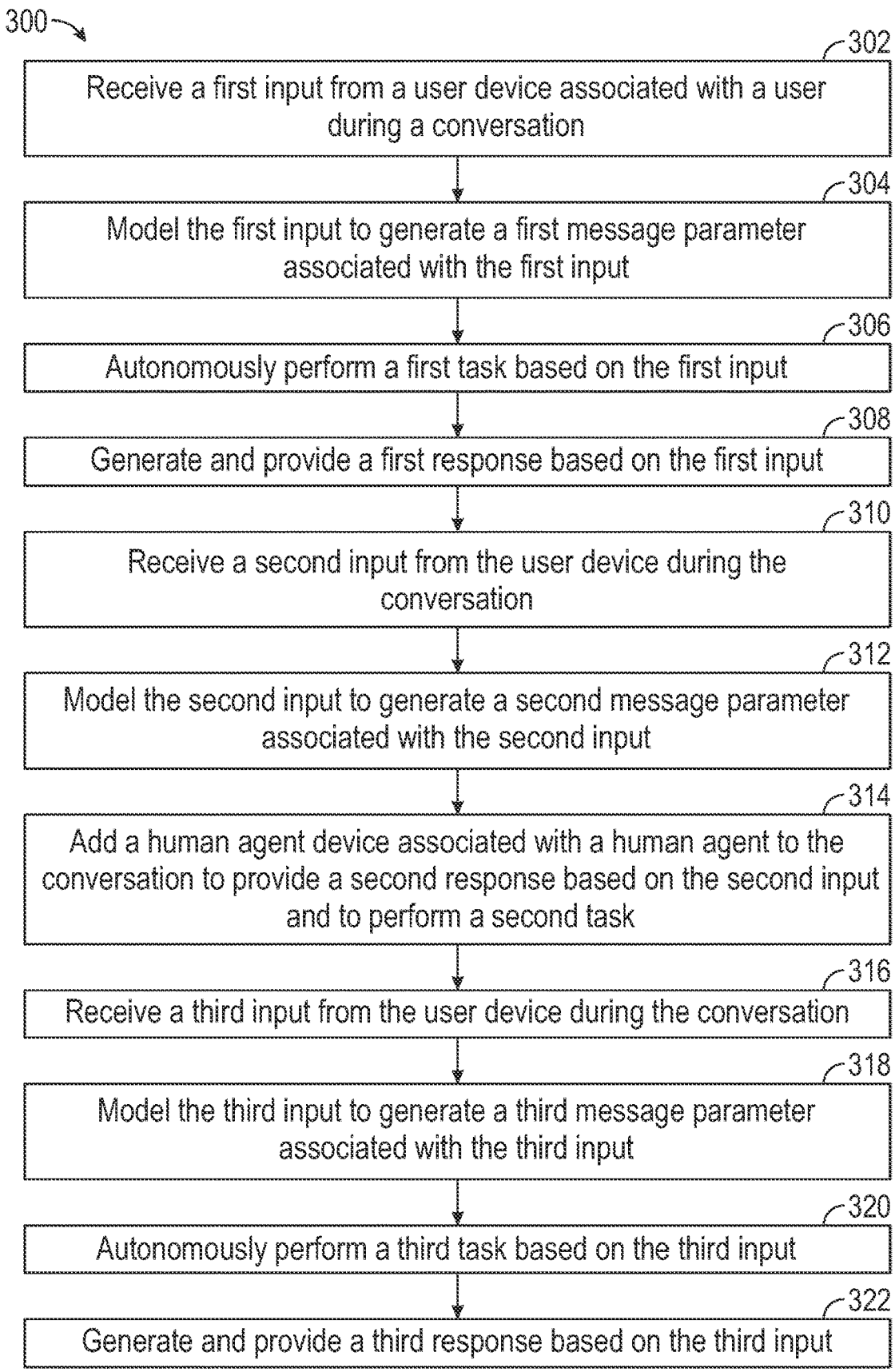
FIG. 3 is a flow diagram of a method for allocating tasks associated with a conversation between autonomous performance and performance by a human agent, according to example embodiments.

Referring now to FIG. 3, a flowchart for a method 300 of allocating tasks associated with a conversation between autonomous performance and performance by a human agent is shown, according to some embodiments. The communication system 110 can be configured to perform the method 300. Further, any of the computing devices described herein (e.g., the user device 140, the human agent device 180, etc.) can be configured to perform the method 300. The responses of the method 300 may be provided by and/or accessible by the user client application 154 and the content control circuit 128, for example. The method 300 may be performed by the provider system 108 and/or the user device 140, described above pertaining to FIGS. 1 and 2. In some embodiments, the method 300 begins in response to receiving, by a user device (e.g., the user device 140) and/or through a user client application (e.g., the user client application 154, etc.) an input. The input can include input data that includes audio data or text data associated with the input. For example, in some instances, a user may initiate a conversation with the communication system 110 by inputting a set of words or phrases into the user client application 154 executed by the user device 140. In some embodiments, the method 300 begins when the communication system 110 receives the input from the user device 140 via the network 130.

At step 302, the method 300 begins with the processing circuit 114 of the communication system 110 receiving a first input from the user device 140 associated with a user during a conversation. The first input may be a set of words or phrases inputted into the user device 140 by the user of the user device 140 into the user client application 154 executed by the user device 140. For example, the user client application 154 may record the first input typed by the user of the user device 140 using a keyboard of the input/output device 160. As another example, the user client application 154 may record the first input spoken by the user of the user device 140 and captured by a microphone of the input/output device 160. As yet another example, the user client application 154 may record the first input as text converted from words or phrases spoken by the user of the user device 140 by a speech-to-text application of the user device 140. In some instances, the processing circuit 114 may receive the input from the user device 140 via the network 130. The conversation may be related to support for the user relating to one or more accounts held by the user with the provider of the provider system 108. For example, the conversation may be a support call relating to issues associated with a bank account when the provider is a bank. As another example, the conversation may be a fraud call relating to a fraud incident associated with a credit card when the provider is a credit card provider. In various embodiments, the conversation is between the user of the user device 140 and a virtual assistant executed by the processing circuit 114.

At step 304, once the processing circuit 114 has received the first input from the user device 140 associated with the user during the conversation, the processing circuit 114 is configured to model the first input to generate a first message parameter associated with the first input. In some instances, the processing circuit 114 uses input processing techniques discussed herein to model the first input to generate the first message parameter. The first message parameter may relate to a first topic associated with the first input. For example, if the first input relates to checking an amount in an account associated with the user of the user device 140, the first message parameter may relate to the topic of "check balance".

In some instances, the first message parameter corresponds with a first task that the processing circuit is authorized to autonomously perform. The processing circuit 114 may determine the first task based on the first input and/or the first message parameter. For example, if the first input is "Lock my account", the processing circuit 114 may determine that the first task is to lock the account of the user based on the first input and/or the first message parameter associated with the first input being fraud protection. In some instances, the processing circuit 114 may be configured to be authorized to autonomously perform tasks that correspond with certain message parameters. For example, the processing circuit 114 may be authorized to autonomously perform tasks that relate to certain topics or tasks with certain message parameters. For example, the processing circuit 114 may be authorized to perform tasks that correspond with the message parameter relating to "balance transfers" based on the provider of the provider system 108 determining that the processing circuit 114 can autonomously perform tasks associated with transferring a balance from a first account associated with the user to a second account associated with a user.

In some instances, the processing circuit 114 is configured to generate message parameters associated with inputs that include a sentiment score based on the words or phrases included in the inputs (e.g., based on the words and phrases used in the first input being associated with a sentiment, based on a tone of the first input being negative, neutral, or positive, etc.). The processing circuit 114 may generate the first message parameter associated with the first input that includes a first sentiment score based on the first input. For example, if the first input includes any of the words "disappointing", "frustrating", or "unpleasant", the processing circuit 114 may generate the first message parameter that includes a low sentiment score based on the negative words included in the first input. In some embodiments, the processing circuit may generate the first message parameter that includes the low sentiment score based upon the first input including words or phrases that indicates that the user desires to speak with a human agent. For example, if the first input includes the phrase "I'd like to speak to an agent", the processing circuit 114 may generate the first message parameter that includes a low sentiment score based on the first input including a phrase indicating that the user desires to speak with a human agent. As another example, if the first input includes any of the words "easy", "grateful", or "thank you", the processing circuit 114 may generate the first message parameter that includes a high sentiment score based on the positive words included in the first input.

In some instances, the processing circuit 114 is authorized to autonomously perform tasks that correspond with message parameters that include a sentiment score that is above a sentiment threshold. The sentiment threshold may be set by the provider of the provider system 108 and correspond with a negativity associated with the inputs that the provider has decided warrants handling by the human agent of the human agent device 180 instead of autonomous performance by the processing circuit 114. For example, if the user of the user device 140 is frustrated and the first input received from the user device 140 is associated with the first message parameter that includes the sentiment score that is over the sentiment threshold, the human agent may be better suited than the processing circuit 114 to calm down the user of the user device 140 and address the first input. As another example, if the user of the user device 140 is satisfied and the first input received from the user device 140 is associated with the first message parameter that includes the sentiment score that is below the sentiment threshold, the processing circuit 114 may be able to continue the conversation with the user without adding the human agent, which may reduce the number of conversations handled by the human agent.

In some instances, the processing circuit 114 is configured to generate message parameters associated with inputs that include a difficulty score based on the inputs. The processing circuit 114 may be configured to generate the first message parameter associated with the first input that includes a first difficulty score based on the first input. For example, if the first input includes words or phrases that the processing circuit 114 cannot identify, the processing circuit 114 may generate the first message parameter that includes a high difficulty score based on the first input being difficult to understand. As another example, if the first input includes words or phrases that the processing circuit 114 can identify (e.g., using the input processing techniques, etc.), the processing circuit 114 may generate the first message parameter that includes a low difficulty score based on the first input being easy to understand.

In some instances, the processing circuit 114 is authorized to autonomously perform tasks that correspond with message parameters that include a difficulty score that is below a difficulty threshold. The difficulty threshold may be set by the provider of the provider system 108 and correspond with a difficulty associated with the inputs that the provider has decided warrants handling by the human agent of the human agent of the human agent device 180 instead of autonomous performance by the processing circuit 114. For example, if the first input received from the user device 140 is a complicated input that includes multiple different issues, the human agent may be better suited that the processing circuit 114 to perform tasks associated with the first input. As another example, if the first input received from the user device 140 is a simple input that includes a single issue that is straight forward, the processing circuit 114 may be able to autonomously perform the tasks associated with the first input, allowing the human agent to perform other tasks.

In some instances, the processing circuit is authorized to perform the first task because the first task is a low authority task. For example, the provider of the provider system 108 may classify certain tasks as low authority tasks that may be performed by the processing circuit 114 based on a difficulty level of the low authority tasks being low or an effect of the low authority tasks being minimal. In some instances, the low authority tasks may be task that would not have a significant impact if incorrectly performed. For example, the provider of the provider system 108 may determine that checking a balance of an account of a user is a low authority task since if performed incorrectly, the user would just be provided with an incorrect balance of the account.

At step 306, once the processing circuit 114 has modeled the first input to generate the first message parameter associated with the first input, the processing circuit 114 is configured to autonomously perform the first task based on the first input. By autonomously performing the first task, the processing circuit 114 may perform the first task without external control (e.g., supervision by an operator of the provider system 108, supervision by the human agent of the human agent device 180, etc.). For example, the processing circuit 114 may execute algorithms or programs stored in the memory 120 in order to autonomously perform the first task.

In some instances, the process of autonomously performing tasks use techniques such as machine learning, predefined criteria, statistical analysis, and pattern recognition to establish relationships between the inputs, the message parameters, and the tasks and autonomously perform the tasks based on those relationships. In some embodiments, autonomously performing task can begin with the selection of an appropriate technique based on the task. It should be understood that the term autonomously perform encompasses a wide range of techniques and approaches aimed at performing the tasks. This could include anything from rule-based systems to machine learning algorithms using autonomous parameters, depending on the tasks. Thus, autonomously performing the tasks involves selecting techniques based on the specific characteristics of the tasks, ensuring that the chose method or methods results in the processing circuit 114 accurately performing the tasks.

In some instances, the machine learning algorithms can be trained and optimized using the cleaned, classified, and linked data and parameters. This training process can include using algorithms to adjust the autonomous parameters such that the error between the predicted task performance and the actual task performance is minimized. Once one or more of the machine learning algorithms are trained and/or optimized, the processing circuit 114 can use the machine learning algorithms to generate autonomously perform tasks. While autonomously performing tasks, the processing circuit 114 could rely on mathematical representations, decision trees, sets of rules, or any other structures that captures how the tasks can be autonomously performed. Moreover, the machine learning algorithms can include various safeguards to ensure privacy and security of user data (e.g., anonymizing the data).

In some instances, the processing circuit 114 may continually evaluate the autonomous performance of the tasks and adjust its behavior based on feedback received from the user of the user device 140, from the human agent of the human agent device 180, or from another source. For example, if the processing circuit 114 autonomously performs a first task associated with a first input received from the user device 140 and then receives a second input from the user device 140 indicating that the user is not satisfied with the performance of the first task, the processing circuit 114 may update its behavior based on receiving the second input from the user device 140. The updates to the behavior may result in more of the users being satisfied with the autonomous performance of the tasks by the processing circuit 114 in the future.

In some instances, the first input received from the user device 140 may include the information required by the processing circuit 114 to autonomously perform the first task or the processing circuit 114 may acquire additional data from a different source (e.g., the data source 134, the external provider system 135, the external data source 170, etc.) to autonomously perform the first task. For example, the first input received from the user device 140 may relate to checking an account balance of an account associated with the user of the user device 140. The first input may include an account number of the account and the processing circuit 114 may look up the account number in the provider system 108 to autonomously determine the account balance of the account or the first input may not include the account number and the processing circuit may determine the account number of the account by referencing the data source 134 of the communication system 110 prior to autonomously determine the account balance of the account.

At step 308, once the processing circuit 114 has autonomously performed the first task based on the first input, the processing circuit 114 is configured to generate and provide a first response based on the first input. In some instances, the first response is provided to the user device 140. For example, the processing circuit 114 may provide the first response to a graphical user interface of the user device 140 or to an audio output device of the user device 140 such that the user of the user device 140 is provided with the first response. The processing circuit 114 may generate the first response by executing algorithms or programs stored in the memory 120. For example, the processing circuit 114 may generate the first response using various response generation techniques or methods based on the first input. In some instances, the first response generated by the processing circuit 114 may also be associated with the first task autonomously performed by the processing circuit 114. For example, the first response may include a summary of the first task performed by the processing circuit 114.

In some instances, the response generation techniques include using rule based system, machine learning models, or generative models to generate the first response based on the first input. For example, the processing circuit 114 may generate the first response based on inputting the first input through a machine learning algorithm configured to generate responses. In some instances, the machine learning algorithms can be trained and optimized using previous conversations between users and human agents. For example, the machine learning algorithms may be fed previous conversations between the users and the human agents so that the machine learning algorithms can learn from the responses provided by the human agents based on the inputs received from the users. The training process can also include using algorithms to adjusts the responses generated by the machine learning algorithms such that the error between provided responses and acceptable responses is minimized. Once one or more of the machine learning algorithms are trained and/or optimized, the processing circuit 114 can use the machine learning algorithms to generate the responses based on the inputs received from the user devices 140. Moreover, the machine learning algorithms can include various safeguards to ensure privacy and security of user data (e.g., anonymizing the data included in the inputs and/or the responses, etc.).

In some instances, once the processing circuit 114 has generated the first response based on the first input, the processing circuit 114 may perform post processing on the first response before providing the first response to the user device 140. For example, the processing circuit 114 may perform grammatical checks on the first response, coherence checks on the first response, or clarity checks on the first response before providing the first response to the user device 140 to ensure a quality of the first response.

In some instances, the processing circuit 114 may continually evaluate the generation of the first response and adjust its behavior based on feedback received from the user of the user device 140, from the human agent of the human agent device 180, or from another source. For example, if the processing circuit 114 generates and provides the first response to the user device and then receives a second input from the user device 140 indicating that the user does not understand the first response, the processing circuit 114 may update its behavior based on receiving the second input from the user device 140. The updates to the behavior may result in more of the users understanding the responses generated by the processing circuit 114 in the future.

At step 310, once the processing circuit has generated and provided the first response based on the first input, the processing circuit is configured to receive a second input from the user device during the conversation. Similar to the first input, the second input may be a set of words or phrases inputted into the user device 140 by the user of the user device 140. For example, the user client application 154 may record the second input typed by the user using the keyboard of the input/output device 160 or spoken by the user using the microphone of the input/output device 160. The second input may be related or unrelated to the first input. For example, if the first input related to opening a bank account, the second input could relate to transferring an amount into the bank account.

At step 312, once the processing circuit has received the second input from the user device during the conversation, the processing circuit is configured to model the second input to generate a second message parameter associated with the second input. In some instances, the processing circuit 114 uses input processing techniques discussed herein to model the second input to generate the second message parameter. The second message parameter may relate to a second topic associated with the second input. For example, if the second input relates to closing a checking account associated with the user of the user device 140, the second message parameter may relate to the topic of "close account". In some instances, the processing circuit 114 is configured to generate the second message parameter associated with the second input that includes a second sentiment score based on the second input. In some instances, the processing circuit 114 is configured to generate the second message parameter associated with the second input that includes a second difficulty score based on the second input.

In some instances, the second message parameter corresponds with a second task that the processing circuit 114 is unauthorized to autonomously perform. The processing circuit 114 may determine the second task based on the second input and/or the second message parameter. For example, if the second input is "Adjust my mortgage", the processing circuit 114 may determine that the second task is to adjust the mortgage of the user based on the first input and/or the second message parameter associated with the second input being mortgage adjustments. In some instances, the processing circuit 114 is unauthorized to autonomously perform the second task based on the second sentiment score included in the second message parameters being above the sentiment threshold and/or the second difficulty score included in the second message parameters being above the difficulty threshold.

In some instances, the processing circuit 114 may be configured to be unauthorized to autonomously perform tasks that correspond with certain message parameters. For example, the processing circuit 114 may be unauthorized to autonomously perform tasks that relate to certain topics or tasks with certain message parameters. For example, the processing circuit 114 may be unauthorized to autonomously perform tasks that correspond with the message parameter relating to "applying for a credit card" based on the provider of the provider system 108 determining that the processing circuit 114 cannot reliably autonomously perform tasks associated with the user applying for a credit card.

In some instances, the processing circuit is unauthorized to perform the second task because the second task is a high authority task. For example, the provider of the provider system 108 may classify certain task as high authority tasks that should not be autonomously performed by the processing circuit 114 based on a difficulty level of the high authority tasks being high or an effect of the high authority tasks being large. In some instances, the high authority task may be tasks that would have a significant impact if incorrectly performed. For example, the provider of the provider system 108 may determine that closing an account of a user is a high authority task since if performed incorrectly, the user would lose the account and may additionally lose any amount held in the account.

In some instances, the processing circuit is unauthorized to perform the task based on an additional input received from the user device 140. In some instances, the additional input may be associated with a location of the user device 140. For example, the processing circuit may be unauthorized to perform the task based on the additional input indicating that the user device 140 is a distance away from a location associated with the provider of the provider system 180 that is less than a distance threshold. Since the user device 140 is within the distance threshold, the processing circuit may be unauthorized to perform the task since the user of the user device 140 may visit the location and discus the input with a human agent stationed at the location to address the input and complete the task. For example, if the user of the user device 140 is at an ATM at a location associated with the provider of the provider system 108, the processing circuit may be unauthorized to perform a task associated with the ATM based on the location of the user device 140 being within a location threshold of the location associated with the provider, such that a human agent stationed at the location associated with the provider may be added to the conversation to assist the user with the task associated with the ATM.

In some instances, the processing circuit may determine the location of the user device 140 via the user device 140 of the user providing the processing circuit with a location of the user device 140 based on a location system of the user device 40 (e.g., a satellite location system, a GPS system, etc.). In some instances, the processing circuit is configured to generate the location of the user device 140 using near field communication technology or beacons (e.g., Bluetooth beacons, etc.) to determine the location of the user device 140. In some instances, the processing circuit is configured to determine the location of the user device 140 relative to the location associated with the provider. For example, the provider may install a Bluetooth beacon at a location configured to ping user devices. The processing circuit may be configured to determine the location of the user device 140 in response to receiving an indication from the user device 140 that the user device 140 has been pinged by the Bluetooth beacon of the provider.

In some instances, the additional input may be associated with the user device 140 scanning (e.g., photographing with a camera, etc.) a QR code of the provider of the provider system. For example, the provider may display a QR code at a location and the processing circuit may be configured to determine the location of the user device 140 in response to receiving an indication that the user device 140 has scanned the QR code. For example, the processing circuit may be unauthorized to perform the task based on the additional input indicating that the user device 140 is proximate a location associated with the provider of the provider system 180 based on the user device 140 scanning a QR code that is located at the location associated with the provider.

In various instances, the additional input may be based on a user input received by the user device 140. For example, the user device 140 may receive a user input from the user indicating that the user desires a human agent to perform the task associated with the input and the processing circuit may be unauthorized to perform the task based on the user input. For example, if a user is proximate a location associated with the provider of the provider system 108, the user may provide a user input to the user device 140 indicating that the user desires for a human agent to be added to the conversation.

At step 314, once the processing circuit 114 has modeled the second input to generate the second message parameter associated with the second input, the processing circuit 114 is configured to add the human agent device 180 associated with a human agent to the conversation to provide a second response based on the second input and to perform the second task. For example, once the processing circuit 114 has determined that the processing circuit 114 is unauthorized to perform the second task, the processing circuit 114 may add the human agent device 180 to the conversation and share a conversation history with the human agent device 180 such that the human agent may access the previous inputs and responses in the conversation (e.g., the first input, the first response, the second input, etc.). The human agent may then perform the second task and provide the second response to the user device 140. In some instances, the human agent may rely on the processing circuit 114 to assist with performing the second task or providing the second response to the user device 140. For example, the human agent may create instructions for the processing circuit 114 to perform the second task and provide the processing circuit 114 with the instructions through the human agent device 180 such that the processing circuit 114 can perform the second task (e.g., non-autonomously, following the instructions of the human agent, etc.). As another example, the human agent may provide the second response to the processing circuit 114 through the human agent device 180 and the processing circuit 114 may provide the second response to the user device 140. In some instances, the processing circuit 114 may perform post processing on the second response prior to providing the second response to the user device 140. For example, the processing circuit 114 may spell check the second response prior to providing the second response to the user device 140.

In some instances, the processing circuit 114 is configured to generate and provide a prompt based on the second input prior to adding the human agent associated with the human agent to the conversation. In some instances, the prompt is provided to the human agent device 180. In some instances, the prompt indicates how the processing circuit 114 would autonomously perform the second task based on the second input. For example, if the second task is to lock an account associated with the user of the user device 140 based on suspected fraud but the processing circuit 114 is unauthorized to autonomously lock the account, the processing circuit 114 may generate the prompt to include a process that the processing circuit 114 would follow to autonomously lock the account and provide the prompt to the human agent device 180 such that the human agent is provided with the process that the processing circuit 114 would follow to autonomously lock the account. In some instances, the prompt also includes a summary of the first task.

In some instances, the processing circuit 114 is configured to receive a query associated with the second input. In some instances, the query is received from the human agent device 180. For example, while the human agent is performing the second task and creating the second response, the human agent may have questions relating to the second input, the second task, or the second response. The human agent may create a query based on the question and provide the query to the processing circuit 114 through the human agent device 180. For example, if the second task is related to closing an account due to fraud, the human agent may create a query to confirm if a fraud report has been filed and provide the query to the processing circuit 114 through the human agent device 180.

In some instances, the processing circuit 114 is configured to generate and provide a query response to the query associated with the second input. In some instances, the response is provided to the human agent device 180. The processing circuit 114 may use the input processing techniques discussed relating to the inputs received from the user device 140 and/or the response generation techniques discussed relating to the responses provided to the user device 140 to generate the query response to the query. For example, the processing circuit 114 may receive a query from the human agent device 180 relating to account information of the user of the user device and the processing circuit 114 may generate a query response to the query that includes the account information and provide the query response to the query to the human agent device 180.

In some instances, the processing circuit 114 may be configured to provide information in the response to the queries received from the human agent device 180 that the processing circuit 114 would not provide in the responses to the inputs received from the user device 140. By restricting the information provided to the user device 140 compared to the information provided to the human agent device 180, the security of the communication system 110 may be increased. For example, the processing circuit 114 may be configured to provide an account number associated with the user of the user device 140 as part of a query response to a query received from the human agent device but not as part of a response to an input received from the user device 140.

In some instances, the processing circuit 114 is configured to generate and provide a first notification alerting the user that the second response is being received from the human agent prior to adding the human agent device associated with the human agent to the conversation to provide the second response based on the second input and to perform the second task. In some instances, the first notification is provided to the user device 140. For example, the first notification may include the text "Notice: You are now communicating with a human agent" to notify the user that the next response during the conversation is being provided from the human agent.

In some instances, the processing circuit 114 is configured to remain in the conversation after adding the human agent device 180 associated with the human agent to the conversation, such that the processing circuit 114 can continue to analyze the conversation and provide responses where appropriate. For example, if the human agent associated with the human agent device 180 has not provided the second response to the user device 140 associated with the second input within a predetermined threshold amount of time, the processing circuit 114 may be configured to provide intermediate responses to the user device 140. For example, the intermediate responses provided to the user device 140 may include a request for the user of the user device 140 to remain patient with the human agent or may include a question if the user of the user device 140 requires any other tasks to be completed while the human agent is completing the second task.

In some instances, once the processing circuit 114 has added the human agent device 180, the processing circuit 114 is configured to monitor a first side of the conversation associated with the human agent of the human agent device 180 and not monitor a second side of the conversation associated with the user of the user device 140. As a result, the processing circuit 114 may use less of the processing power of the processor 116 while the human agent is providing the second response based the second input and performing the second task such that the processing circuit 114 is operated more efficiently. Additionally, the processing circuit 114 may use less of the bandwidth of the network 130 since the processing circuit 114 does not monitor the second side of the conversation associated with the user such that the computing environment 100 is operated more efficiently. Additionally, the processing circuit 114 may continue to monitor the first side of the conversation associated with the human agent in order to provide assistance to the human agent while the human agent is providing the second response and performing the second task or answer queries provided by the human agent regarding the second input, the second response, or the second task, such that the processing circuit 114 may continue to assist the human agent while reducing the amount of processing power utilized by the processing circuit 114. In some instances, the processing circuit 114 resumes monitoring the second side of the conversation associated with the user after receiving an indication that the human agent has completed the second task or after receiving an input from the user device 140 during the conversation that is associated with a message parameter associated with a task that the processing circuit 114 is authorized to autonomously perform.

In some instances, the processing circuit 114 may request to contribute to the conversation after adding the human agent device 180 associated with the human agent to the conversation. The request may be provided to the human agent device 180 and/or the user device 140 and the processing circuit 114 may contribute to the conversation in response to receiving an approval corresponding to the request from the human agent device 180 and/or the user device 140. For example, while the human agent is working to complete the second task, the user of the user device 140 may provide an intermediate input associated with an intermediate task. The processing circuit 114 may provide an intermediate request corresponding to the intermediate input to the human agent device 180 and in response to receiving an intermediate approval from the human agent device 180, the processing circuit 114 may provide an intermediate response associated with the intermediate input to the user device 140 and/or the human agent device 180. In some instances, once the processing circuit 114 has added the human agent device 180, the processing circuit 114 is configured to initiate a hibernation mode. The hibernation mode may cause the processing circuit 114 to utilize less of the processing power of the processor 116 while the human agent is providing the second response based the second input and performing the second task such that the processing circuit 114 is operated more efficiently. Additionally, the hibernation mode may result in the processing circuit 114 utilizing less of the network 130 such that the computing environment 100 is operated more efficiently. In the hibernation mode, the processing circuit 114 may not actively monitor the conversation between the user of the user device 140 and the human agent of the human agent device 180. In hibernation mode, the processing circuit 114 may monitor for queries from the human agent device 180 and provide the information in response to the queries. In some instances, once the processing circuit 114 has provided the information in response to the queries, the processing circuit 114 may return to the hibernation mode to utilize less of the processing power of the processor 116. The processing circuit 114 may exit the hibernation mode after receiving an input from the user device 140 during the conversation that is associated with a message parameter associated with a task that the processing circuit 114 is authorized to autonomously perform. For example, after determining that the processing circuit 114 is unauthorized to autonomously perform a first task associated with an activation of an account, the processing circuit 114 may initiate the hibernation mode. Once the processing circuit 114 receives an input associated with a second task associated with setting up log in information of the account that the processing circuit 114 is authorized to perform, the processing circuit 114 may end the hibernation mode and utilize additional of the processing power of the processor 116 to autonomously perform the second task. In some instances, the processing circuit 114 may exit the hibernation mode after receiving an indication that the human agent has performed the second task.

In some instances, once the processing circuit 114 has added the human agent device 180, the processing circuit 114 is configured to power off while the human agent is providing the second response based on the second input and performing the second task. While powered off, the processing circuit 114 may utilize significantly less or none of the processing power of the processor 116 such that the processing circuit 114 is operated more efficiently. Additionally, while powered off, the processing circuit may utilize significantly less or none of the bandwidth of the network 130 such that the computing environment 100 is operated more efficiently. In some instances, the processing circuit may power on after receiving an input from the user device 140 during the conversation that is associated with a message parameter associated with a task that the processing circuit 114 is authorized to autonomously perform. In some instances, the processing circuit 114 may power on after receiving an indication that the human agent has performed the second task In some instances, the processing circuit 114 may power on after receiving a query from the human agent of the human agent device 180, provide an answer to the query, and power off again.

At step 316, once the processing circuit has added the human agent device associated with the human agent to the conversation to provide the second response based on the second input and to perform the second task, the processing circuit is configured to receive a third input from the user device during the conversation. Similar to the first input and the second input, the third input may be a set of words or phrases inputted into the user device 140 by the user of the user device 140. For example, the user client application 154 may record the third input typed by the user using the keyboard of the input/output device 160 or spoken by the user using the microphone of the input/output device 160. The third input may be related or unrelated to the first input and/or the second input. For example, if the first input related to opening the bank account and the second input relates to transferring the amount into the bank account, the third input could relate to checking a balance of the bank account after the amount has been transferred.

At step 318, once the processing circuit 114 has received the third input from the user device during the conversation, the processing circuit 114 is configured to model the third input to generate a third message parameter associated with the third input. In some instances, the processing circuit 114 uses the input processing techniques discussed herein to model the third input to generate the third message parameter. In some instances, the third message parameter corresponds with a third task that the processing circuit 114 is authorized to autonomously perform, similar to the first message parameter corresponding with the first task that the processing circuit 114 is authorized to autonomously perform. In some instances, the processing circuit 114 is configured to generate the third message parameter associated with the third input that includes a third sentiment score based on the third input. In some instances, the processing circuit 114 is configured to generate the third message parameter associated with the third input that includes a second third score based on the third input. In some instance, similar to the first task, the processing circuit is authorized to perform the third task because the third task is a low authority task.

In some instances, the third message parameter may correspond with the third task that the processing circuit 114 is authorized to autonomously perform based on receiving an input from the human agent device that the processing circuit 114 may autonomously perform the third task. For example, the processing circuit 114 may receive the third input from the user device 140 and provide the third input to the human agent device 180. The human agent associated with the human agent device 180 may review the third input to determine if the human agent should handle the third input or if the processing circuit 114 should handle the third input. Based on the human agent determining that the processing circuit 114 should handle the third input, the human agent may provide the input to the human agent device 180 resulting in the third message parameter corresponding with the third task that the processing circuit 114 is authorized to autonomously perform.

At step 320, once the processing circuit 114 has modeled the third input to generate the third message parameter associated with the third input, the processing circuit 114 is configured to autonomously perform the third task based on the third input. By autonomously performing the third task, the processing circuit 114 may perform the third task without external control. For example, the processing circuit 114 may execute algorithms or programs stored in the memory 120 in order to autonomously perform the third task. In some instances, the processing circuit 114 may autonomously perform the third task using the processing of autonomously performing tasks discussed herein.

In some instances, the third input received from the user device 140 may include the information required by the processing circuit 114 to autonomously perform the third task or the processing circuit 114 may acquire additional data from a different source (e.g., the data source 134, the external provider system 135, the external data source 170, etc.) to autonomously perform the third task.

At step 322, once the processing circuit has autonomously performed the third task based on the third input, the processing circuit is configured to generate and provide a third response based on the third input. In some instances, the third response is provided to the user device 140. The processing circuit 114 may generate the third response by executing algorithms or programs stored in the memory 120. For example, the processing circuit 114 may generate the third response using the various response generation techniques or methods discussed above relating to the first response. In some instances, the third response generated by the processing circuit 114 may also be associated with the third task autonomously performed by the processing circuit 114. For example, the third response may include a summary of the third task performed by the processing circuit 114. In some instances, the processing circuit 114 is configured to consider previous inputs (e.g., the first input, the second input, etc.) and previous responses (e.g., the first response, the second response, etc.) of the conversation while generating the third response.

In some instances, once the processing circuit 114 has generated the third response based on the third input, the processing circuit 114 may perform post processing on the third response before providing the third response to the user device 140. For example, the processing circuit 114 may perform grammatical checks on the third response, coherence checks on the third response, or clarity checks on the third response before providing the third response to the user device 140 to ensure a quality of the third response.

In some instances, the processing circuit 114 may continually evaluate the generation of the third response and adjust its behavior based on feedback received from the user of the user device 140, from the human agent of the human agent device 180, or from another source. For example, if the processing circuit 114 generates and provides the third response to the user device and then receives a fourth input from the user device 140 indicating that the user does not understand the third response, the processing circuit 114 may update its behavior based on receiving the fourth input from the user device 140. The updates to the behavior may result in more of the users understanding the responses generated by the processing circuit 114 in the future.

In some instances, the processing circuit 114 is configured to generate and provide a second notification alerting the user that the third response is generated by the processing circuit prior to generating and providing the third response based on the third input. In some instances, the second notification is provided to the user device 140. For example, the second notification may include the text "Notice: You are not communicating with the chatbot" to notify the user that the next response during the conversation is being provided from the human agent.

In some instances, the processing circuit 114 is configured to generate and provide a summary of the first task, the second task, and the third task. In some instances, the summary is provided to the user device 140. In some instances, the summary is based on the first response, the second response, and the third response. For example, the summary may include content associated with actions performed during the first task, the second task, and the third task such that the user may review the summary to be reminded of the tasks that were completed during the conversation. In some instances, the processing circuit 114 may generate the summary using the various response generation techniques or methods discussed above relating to the first response. In some instances, the processing circuit 114 may perform post processing on the summary prior to providing the summary to the user device 140. In some instances, the process of modeling the inputs to generate the message parameters can include using techniques such as machine learning, statistical analysis, and pattern recognition to establish relationships between the inputs and data and generate resulting message parameters based on those relationships. In some embodiments, modeling can begin with the selection of an appropriate model based on the input. It should be understood that the term modeling herein encompasses a wide range of techniques and approaches aimed at understanding relationships within data. This could include anything from statistical methods and rule-based systems to machine learning algorithms, depending on the nature of the data. Thus, modeling involves selecting techniques based on the specific characteristics of the inputs, ensuring that the chosen method or methods accurately captures relationships.

In some instances, the model parameters can be trained and optimized using the cleaned, classified, and linked data and parameters. This training process can include using algorithms to adjust the model parameters such that the error between the model's predictions and the actual outcomes is minimized. The modeling process can also include feature engineering, which is the process of creating new features or modifying existing ones to improve the model's power. For example, instead of modeling each of the words in the inputs to generate the message parameters associated with each of the inputs, a feature that ignores common filler speech such as "um", "like", or "you know" might result in a more efficient model to the fact that filler speech does not typically convey any real meaning in the inputs and can be discarded while determining the message parameters for the inputs.

Once one or more models or techniques are trained and/or optimized, the processing circuits can use the model to generate resultant data. The resultant data could be a mathematical representation, a decision tree, a set of rules, or any other structure that captures the relationships between different data points. Moreover, the modeling process can include various safeguards to ensure privacy and security of user data (e.g., anonymizing the data).

In some embodiments, the processing circuits can use rule-based systems to model the inputs. Rule-based systems can be where predefined rules are created by the processing circuits (or domain experts) to infer outcomes based on given conditions. For example, a rule may state that any of the inputs containing the words "frustrating", "annoying" or "unpleasant" should indicate that the tone of the inputs is negative and the message parameters associated with the inputs should correspond with tasks that the processing circuit 114 is unauthorized to autonomously perform, such that the tasks may be performed by a human agent who may be more effective in reducing the negativity of the user associated with the user device that provided the inputs with the negative tone. This rule can be applied to the process to identify inputs with negative tones and assign tasks corresponding to these inputs to human agents.

In some instances, the process of modeling the inputs to generate the message parameters can include the input processing techniques utilized by the processing circuit. The input processing techniques utilized by the processing circuit to generate the message parameters can include text recognition techniques utilized to analyze the inputs received from the user device 140. For example, the processing circuit 114 may receive the inputs from the user device 140 in text form and each of the inputs may include sets of words or phrases. The processing circuit 114 may start by breaking the inputs into tokens. The tokens may be sets of words, individual words, subwords, and/or individual characters. The processing circuit 114 may then compare the tokens to a language database (e.g., one of the external data sources 170 configured as a language database, a language database contained in the data source 134, a machine learning based language model, etc.) and utilize pattern recognition techniques to identify patterns and/or structures in the inputs based on the information from the language database. Based on the information obtained from the language database and the pattern recognition, the processing circuit 114 may recognize and understand the meaning of the inputs. In other instances, one of the other computing devices discussed herein is configured to perform the text recognition techniques. For example, the user device 140 may perform the text recognition techniques prior to providing the inputs to the communication system 110. As another example, the communication system 110 may provide the inputs to one of the external provider systems 135 configured to perform the text recognition techniques (e.g., a third party provider that creates text recognition software that is utilized by the communication system 110 to understand the inputs received from the user device 140, etc.).

In some instances, the input processing techniques utilized by the processing circuit to generate the message parameters include speech to text techniques utilized to convert audio inputs received from the user device 140 into text, such that the text recognition techniques can be applied to the text. For example, the processing circuit 114 may receive the inputs from the user device 140 in audio form and each of the inputs may include sounds corresponding to sets of words or phrases. The processing circuit 114 may start by extracting relevant features of the inputs in order to eliminate any background sound (e.g., feedback, noise, etc.). The processing circuit 114 may then apply speech recognition algorithms to the inputs to convert the audio inputs into text. The speech recognition algorithms may use acoustic models to match audio features of the audio inputs into text. In other instances, one of the other computing devices discussed herein is configured to perform the speech to text techniques. For example, the user device 140 may perform the speech to text techniques on the audio input prior to providing the audio input to the processing circuit 114. As another example, the communication system 110 may provide the audio inputs to one of the external provider systems 135 configured to perform the speech to text techniques (e.g., a third party provider that creates speech to text software that is utilized by the communication system 110 to convert the audio inputs received from the user device 140 into text, etc.).

In some instances, the inputs received from the user device 140 may include the information required to model the inputs to generate the message parameters or the modeler circuit 124 may receive additional data from a different source (e.g., the external provider system 135, the external data source 170, etc.) to model the inputs to generate the message parameters. For example, an input received from the user device 140 may include words that are included in the data source 134 or the input may include words that are not included in the data source 134 and the processing circuit 114 may need to receive the meaning of the words that are not included in the data source 134 from a different source (e.g., the external provider system 135, the external data source 170, etc.).

The processing circuit 114 may generate and provide an interface to the user device 140. In some instances, the processing circuit can generate and provide a user interface corresponding to the responses (e.g., the first response, the second response, the third response, etc.) to the GUI of the user device (e.g., the user device 140. For example, after the processing circuit generates the first response based on the first input, the processing circuit can provide the first response to the GUI of the user device as the user interface. The user interface may include content related to the first response such as an image associated with the first response, a description of the first response, text associated with the first response, etc. For example, if the first response corresponds to opening a bank account, the user interface may include an account number of the bank account, a logo of a bank associated with the bank account, etc. In other embodiments, the processing circuit can generate and provide audio response data corresponding to the responses to the user device that may be outputted by a speaker of the user device. In some instances, the processing circuit 114 may update the interface provided to the user device 140 to include the summary of the first task, the second task, and the third task such that the user of the user device 140 is provided with the summary in the interface. The summary may include content associated with each of the actions performed during the first task, the second task, and the third task such that the user may review the summary in the interface to be reminded of the tasks that were completed during the conversation.

In some instances, as described below, the processing circuit 114 is configured to determine recommended summary content of the summary of the conversation for the user using one or more machine learning models. Accordingly, in some instances, the content of the summary may be arranged such that the recommended summary content is displayed more prominently than the other summary content. For example, in some instances, the recommended summary content may be bolded, underlined, enlarged, or moved to an uppermost location (e.g., a first summary element, etc.) of the summary. In some instances, upon the one or more machine learning models determining that the recommended summary content for the user has changed, the processing circuit 114 is configured to modify or update the interface provided to the user device 140 to rearrange or redesign the summary such that the new recommended summary content is prominently displayed instead of the previous recommended summary content.

Furthermore, in some instances, the widgets, elements, and features shown within the interface provided to the user device 140 may be arranged within the corresponding graphical user interfaces of the user device 140 based on their estimated relevance to the user. For example, in some instances, the processing circuit 114 is configured to estimate the most relevant and/or most useful widgets, elements, and features for inclusion in the interface provided to the user device 140 using one or more machine learning models of the processing circuit 114. In some instances, the processing circuit 114 may train the one or more machine learning models to identify the most relevant and/or useful widgets, elements, and features for inclusion in the interface using various training data. The training data may comprise historical utilization of similar features, elements, and widgets by users, corresponding inputs received from users after the processing circuit 114 provided responses or summaries to the users, and corresponding user information (e.g., income level, geographical location, number of accounts associated with the provider of the provider system 108, types of accounts associated with the provider of the provider system 108, etc.) associated with those users. In some instances, the training data may be data compiled over time from a variety of users associated with the provider of the provider system 108 and stored within a database associated with the provider system 108 (e.g., the data source 134, the external data source 170, etc.).

Accordingly, once the one or more machine learning models have been trained, the processing circuit 114 may apply the inputs and/or the tasks associated with the conversation and various user information pertaining to the user to the one or more machine learning models to identify the most relevant and/or useful widgets, elements, and features for inclusion in the interface provided to the user device 140. The processing circuit 114 may further arrange the widgets, elements, and features specifically in the interface provided to the user device 140 according to their estimated relevance. For example, in some instances, the most relevant features may be arranged in a top left corner of the interface provided to the user device 140. The widgets, elements, and features may then be arranged in descending order of relevance from left to right and top to bottom within the interface provided to the user device 140. In some instances, the processing circuit 114 is configured to utilize various feedback information (e.g., features, elements, and widgets actually used by the user, elements related to additional inputs received from the user, etc.) received from the user (e.g., via the user device 140, etc.) to retrain or otherwise update the one or more machine learning models. Accordingly, in some instances, the processing circuit 114 may rearrange the widgets, elements, and/or features in the interface based on the updated machine learning models and their associated outputs.

In some instances, the processing circuit can generate and provide an agent interface to the human agent device (e.g., the human agent device 180, etc.) corresponding to the responses to the queries received from the human agent device. For example, after the processing circuit has received a query associated with an input from the human agent device and generated a query response to the query, the processing circuit may provide the agent interface to the human agent device including content relating to the response such as a summary of the response or an image associated with the response. In other embodiments, the processing circuit can generate and provide audio response data corresponding to the responses to the queries to the human agent device that may be outputted by a speaker of the human agent device.

In some instances, the agent interface may correspond to the prompts generated by the processing circuit corresponding to the tasks that the processing circuit is unauthorized to autonomously perform. For example, after the processing circuit generates a prompt based on an input that indicates how the processing circuit would autonomously perform a task that the processing circuit is unauthorized to autonomously perform if the processing circuit were authorized to perform the task, the processing circuit may provide the agent interface to the human agent device that includes content related to the prompt such as a process that the processing circuit would follow to autonomously complete the task. In other embodiments, the processing circuit can generate and provide audio prompt data corresponding to the prompts to the human agent device that may be outputted by a speaker of the human agent device.

In some instances, similar to the interface provided to the user device 140, the widgets, elements, and features shown within the agent interface provided to the human agent device 180 may be arranged within the corresponding graphical user interface of the human agent device 180 based on their estimated relevance to the human agent. For example, in some instances, the processing circuit 114 is configured to estimate the most relevant and/or most useful widgets, elements, and features for inclusion in the agent interface provided to the human agent device 180 using one or more machine learning models of the processing circuit 114. In some instances, the processing circuit 114 may train the one or more machine learning models to identify the most relevant and/or useful widgets, elements, and features for inclusion in the agent interface using various training data. The training data may comprise historical utilization of similar features, elements, and widgets by human agents, responses provided by the human agents after the processing circuit 114 provided prompts or answers to queries to the human agents, and corresponding human agent information (e.g., title, experience level, etc.) associated with those human agents. In some instances, the training data may be data compiled over time from a variety of human agents associated with the provider of the provider system 108 (e.g., employees of the provider, contractors of the provider, etc.) and stored within a database associated with the provider system 108 (e.g., the data source 134, the external data source 170, etc.).

Accordingly, once the one or more machine learning models have been trained, the processing circuit 114 may apply the inputs, the tasks, the queries, and/or the prompts associated with the conversation and various human agent data pertaining to the human agent to the one or more machine learning models to identify the most relevant and/or useful widgets, elements, and features for inclusion in the agent interface provided to the human agent device 180. In some instances, the processing circuit may apply various user information pertaining to the user to the one or more machine learning models to identify the most relevant and/or useful widgets, elements, and features for inclusion in the agent interface provided to the human agent device 180. The processing circuit 114 may further arrange the widgets, elements, and features in the agent interface provided to the human agent device 180 according to their estimated relevance. In some instances, the processing circuit 114 is configured to utilize various feedback information (e.g., features, elements, and widgets actually used by the human agent, elements related to additional inputs received from the user, elements related to additional queries received from the human agent, etc.) received from the user (e.g., via the user device 140, etc.) and/or the human agent (e.g., via the human agent device 180, etc.) to retrain or otherwise update the one or more machine learning models. Accordingly, in some instances, the processing circuit 114 may rearrange the widgets, elements, and/or features in the agent interface based on the updated machine learning models and their associated outputs.

Figure 4:
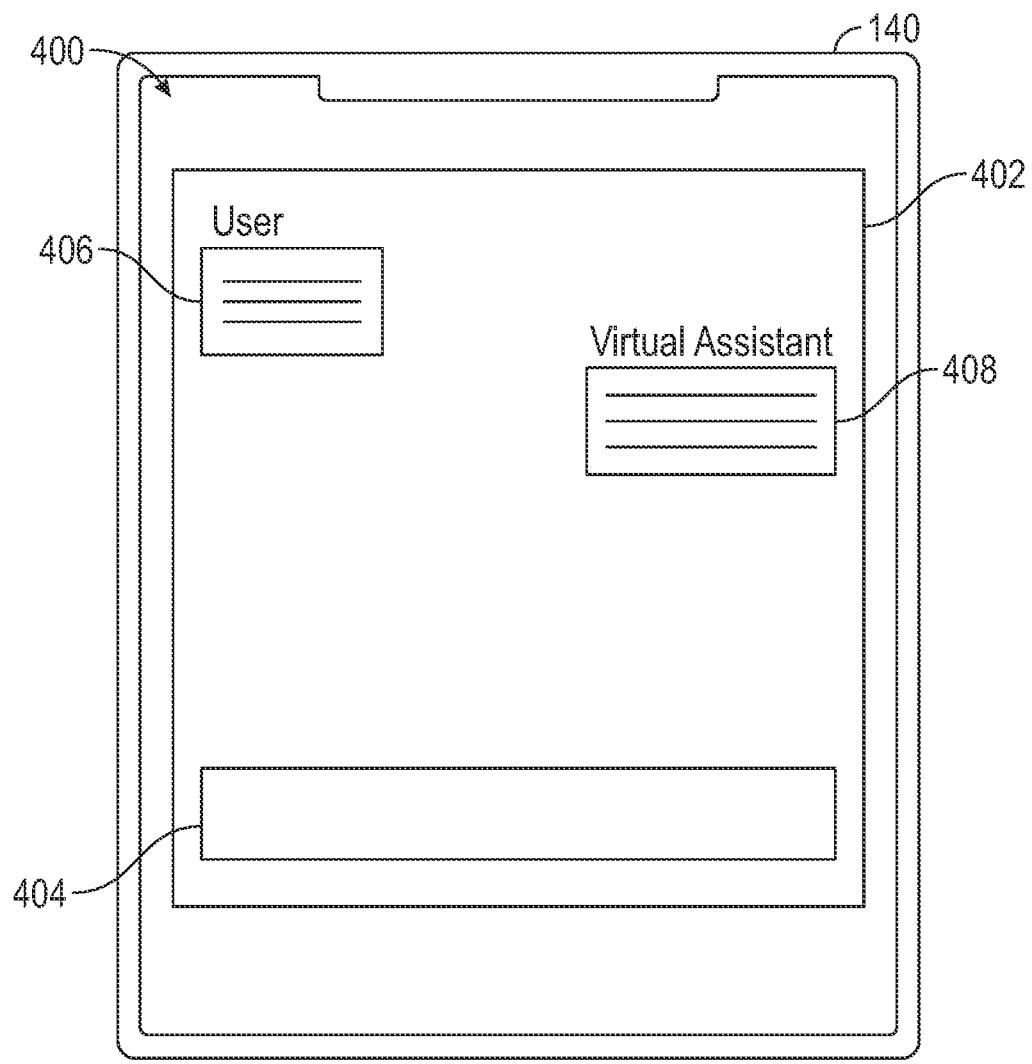
FIG. 4 is an illustration of a configuration of a user interface generated by the communication system of FIG. 1, according to example embodiments.

Referring now to FIG. 4, an illustration of a configuration of a user interface 400 on the user device 140 is shown. The user interface 400 may be presented within the user client application 154. In some embodiments, the user interface 400 is generated and provided by the content control circuit 128 and transmitted to the user device 140 to be displayed to a user.

As illustrated, the user interface 400 includes a conversation interface 402, an input actionable item 404, a first input element 406, and a first response element 408. As illustrated, conversation interface 402 may be a window (e.g., a program window, a display window, etc.) included in the user interface 400. The conversation interface 402 may display a conversation between a user, a virtual assistant executed by the processing circuit 114, and a human agent on a GUI of the user device 140 such that the user may be provided with the conversation between the user and the virtual assistant. In some instances, the conversation interface 402 may only be displayed in a portion of the user interface 400. In other instances, the conversation interface 402 is displayed across an entirety of the user interface 400.

The input actionable item 404 may indicate a portion of the conversation interface 402 where the user of the user device 140 may enter inputs associated with the user during the conversation with the virtual assistant. As illustrated, the input actionable item 404 is a text box where the user may enter text to create the inputs during the conversation. For example, the user may select the input actionable item 404 and may type words or phrases on a keyboard communicably coupled to the user devices 140 to create the input during the conversation. As another example, the user may select the input actionable item 404 and may speak a message that is provided to the user device 140 to create the inputs during the conversation.

The first input element 406 may indicate a first input associated with the user during the conversation with the virtual assistant executed by the processing circuit 114. As illustrated, the first input element 406 is a text box that corresponds with the first input associated with the user during the conversation with the virtual assistant. In some instances, the first input element 406 may include figures indicating the first input associated with the user, elements indicating the first input associated with the user, etc. For example, the first input element 406 may include text corresponding to the input associated with the user and the first input element 406 may additionally be colored with a first color that is different from a second color associated with the first response element 408 such that the user may easily distinguish between the first input element 406 and the first response element 408. The first input element 406 may indicate a question from the user of the user device 140 to the virtual assistant or a portion of the conversation between the user and the virtual assistant. In some instances, the first input element 406 corresponds with a first task that the processing circuit 114 executing the virtual assistant is authorized to autonomously perform.

The first response element 408 may indicate the first response provided by the virtual assistant executed by the processing circuit 114 based on the first input associated with the first input element 406 where the first input is associated with the first task that the processing circuit 114 is authorized to autonomously perform. As illustrated, the first response element 408 is a text box that corresponds with the first response based on the first input associated with the first input element 406. In some instances, the first response element 408 may include figures indicated the response based on the first input associated with the first input element 406. In some instances, the first response element 408 may be related to the first task autonomously performed by the processing circuit 114. For example, the first response element 408 may include a confirmation that the first task was autonomously performed by the processing circuit 114 or a summary of the first task autonomously performed by the processing circuit 114.

Figure 5:
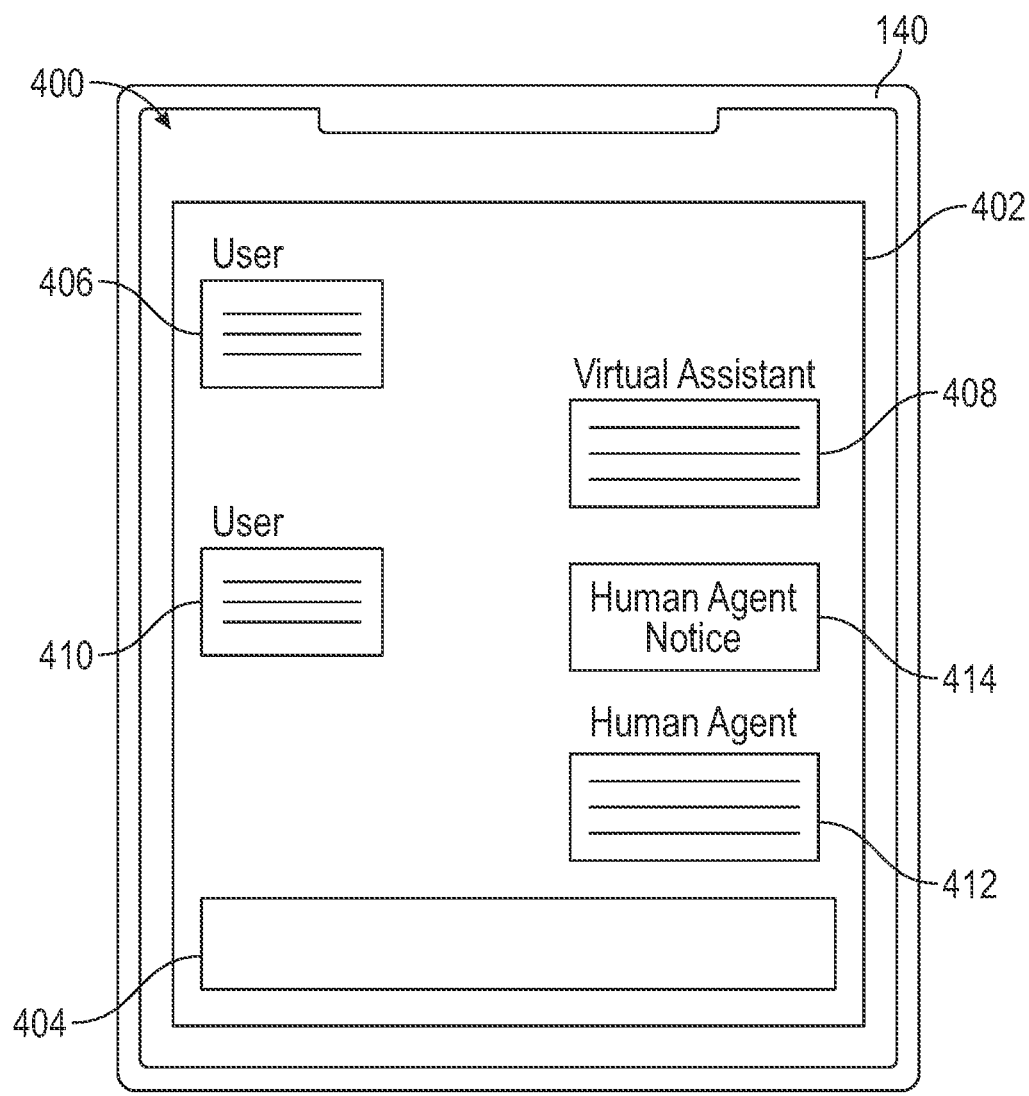
FIG. 5 is an illustration of a configuration of a user interface generated by the communication system of FIG. 1, according to example embodiments.

Referring now to FIG. 5, an illustration of a configuration of the user interface 400 on the user device 140 is shown. As illustrated, the user interface 400 includes the conversation interface 402, the input actionable item 404, the first input element 406, the first response element 408, a second input element 410, a second response element 412, and a first notification element 414. The second input element 410 may indicate a second input associated with the user during the conversation with the virtual assistant executed by the processing circuit 114. As illustrated, the second input element 410 is a text box that corresponds with the second input associated with the user during the conversation with the virtual assistant. The first input indicated by the first input element 406 may be related to or unrelated to the second input indicated by the second input element 410. In some instances, the second input element 410 may include figures indicating the second input associated with the user, elements indicating the second input associated with the user, etc. In some instances, the second input element 410 corresponds with a second task that the processing circuit 114 executing the virtual assistant is unauthorized to autonomously perform.

The second response element 412 may indicate the second response provided by the human agent of the human agent device 180 based on the second input associated with the second input element 410 when the second input is associated with the second task that the processing circuit 114 is unauthorized to autonomously perform. For example, after the processing circuit 114 generates the second message parameter associated with the second input that corresponds with the second task that the processing circuit 114 is unauthorized to perform, the processing circuit 114 may add the human agent device 180 associated with the human agent to the conversation so that the human agent can perform the second task and provide the second response associated with the second response element 412. As illustrated, the second response element 412 is a text box that corresponds with the second response based on the second input associated with the second input element 410. In some instances, the second response element 412 may include figures indicated the second response based on the second input associated with the second input element 410. In some instances, the second response element 412 may be related to the second task performed by the human agent of the human agent device 180.

The first notification element 414 may indicate that that the second response associated with the second response element 412 is being received from a human agent. In some instances, the first notification element 414 may be provided to the GUI of the user device 140 before the processing circuit 114 adds the human agent device 180 to the conversation. As illustrated, the first notification element 414 is a text box that corresponds with the first notification alerting the user that the second response is being received from the human agent.

Figure 6:
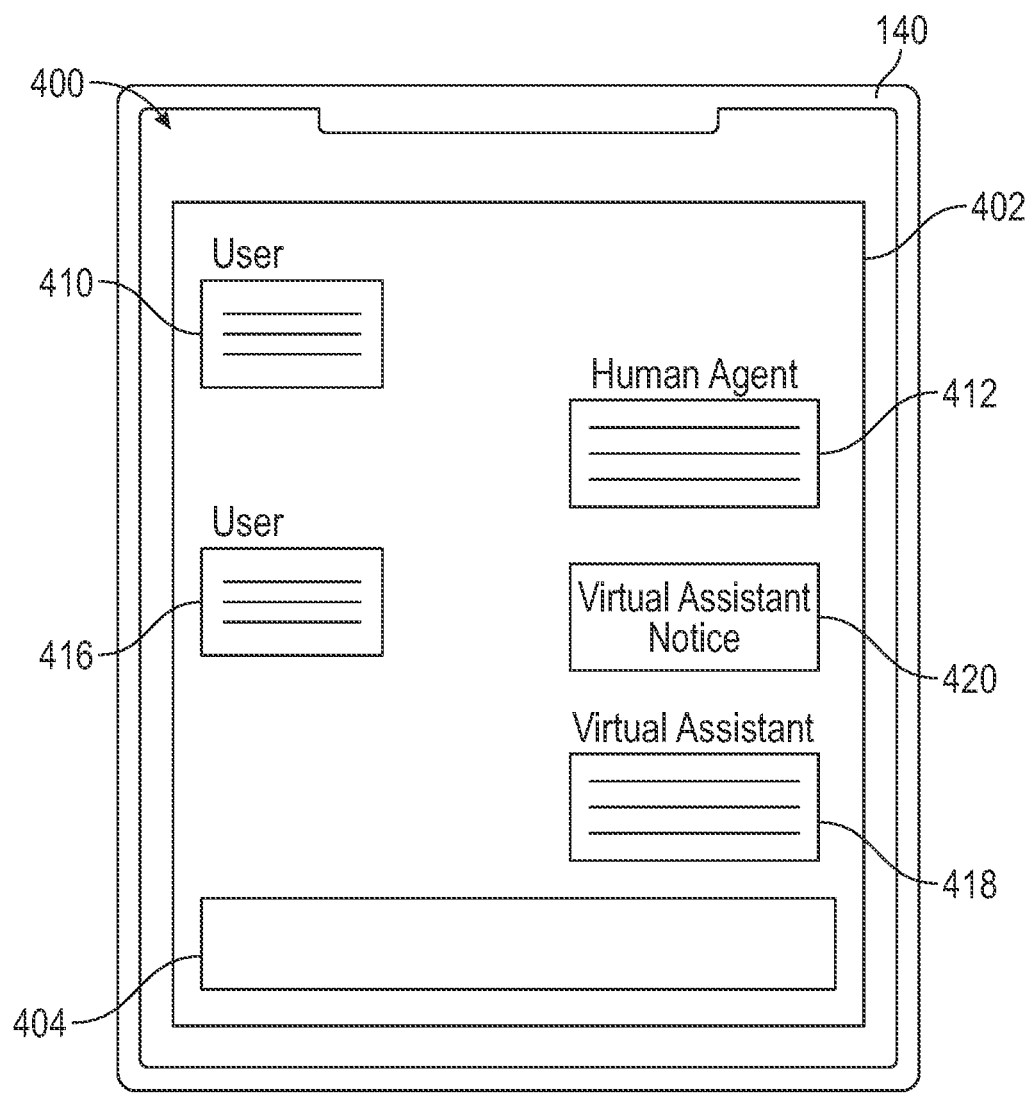
FIG. 6 is an illustration of a configuration of a user interface generated by the communication system of FIG. 1, according to example embodiments.

Referring now to FIG. 6, an illustration of a configuration of the user interface 400 on the user device 140 is shown. As illustrated, the user interface 400 includes the conversation interface 402, the input actionable item 404, the second input element 410, the second response element 412, a third input element 416, a third response element 418, and a second notification element 420. The third input element 416 may indicate a third input associated with the user during the conversation with the virtual assistant executed by the processing circuit 114. As illustrated, the third input element 416 is a text box that corresponds with the third input associated with the user during the conversation with the virtual assistant. The first input indicated by the first input element 406 and the second input indicated by the second input element 410 may be related to or unrelated to the third input indicated by the third input element 416. In some instances, the third input element 416 may include figures indicating the third input associated with the user, elements indicating the third input associated with the user, etc. In some instances, the third input element 416 corresponds with a third task that the processing circuit 114 executing the virtual assistant is authorized to autonomously perform.

The third response element 418 may indicate the third response provided by the virtual assistant executed by the processing circuit 114 based on the third input associated with the third input element 416 where the third input is associated with the third task that the processing circuit 114 is authorized to autonomously perform. As illustrated, the third response element 418 is a text box that corresponds with the third response based on the third input associated with the third input element 416. In some instances, the third response element 418 may include figures indicated the response based on the third input associated with the third input element 416. In some instances, the third response element 418 may be related to the third task autonomously performed by the processing circuit 114. For example, the third response element 418 may include a confirmation that the third task was autonomously performed by the processing circuit 114 or a summary of the third task autonomously performed by the processing circuit 114.

The second notification element 420 may indicate that that the third response associated with the third response element 418 is being generated by the processing circuit 114. In some instances, the second notification element 420 may be provided to the GUI of the user device 140 before the processing circuit 114 generates the third response. As illustrated, the second notification element 420 is a text box that corresponds with the third notification alerting the user that the third response is being generated by the processing circuit 114.

Figure 7:
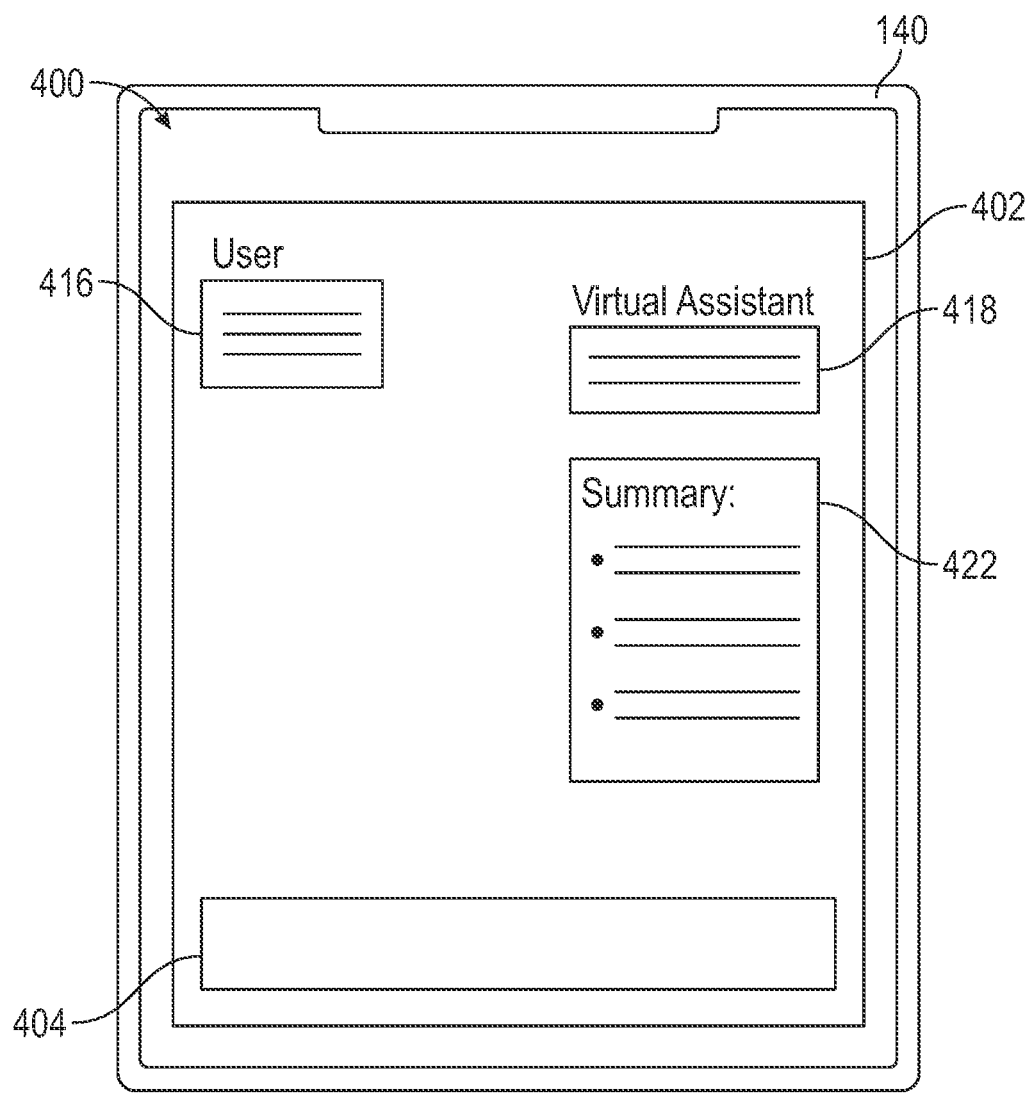
FIG. 7 is an illustration of a configuration of a user interface generated by the communication system of FIG. 1, according to example embodiments.

Referring now to FIG. 7, an illustration of a configuration of the user interface 400 on the user device 140 is shown. As illustrated, the user interface 400 includes the conversation interface 402, the input actionable item 404, the third input element 416, the third response element 418, and a summary element 422. The summary element 422 may include a summary of the first task, the second task, and the third task. The summary element 422 may be generated by the processing circuit 114. In some instances, the summary may be based on the first response associated with the first response element 408, the second response associated with the second response element 412, and the third response associated with the third response element 418. As illustrated, the summary element 422 is a text bot that corresponds with the summary of the first task, the second task, and the third task.

Figure 8:
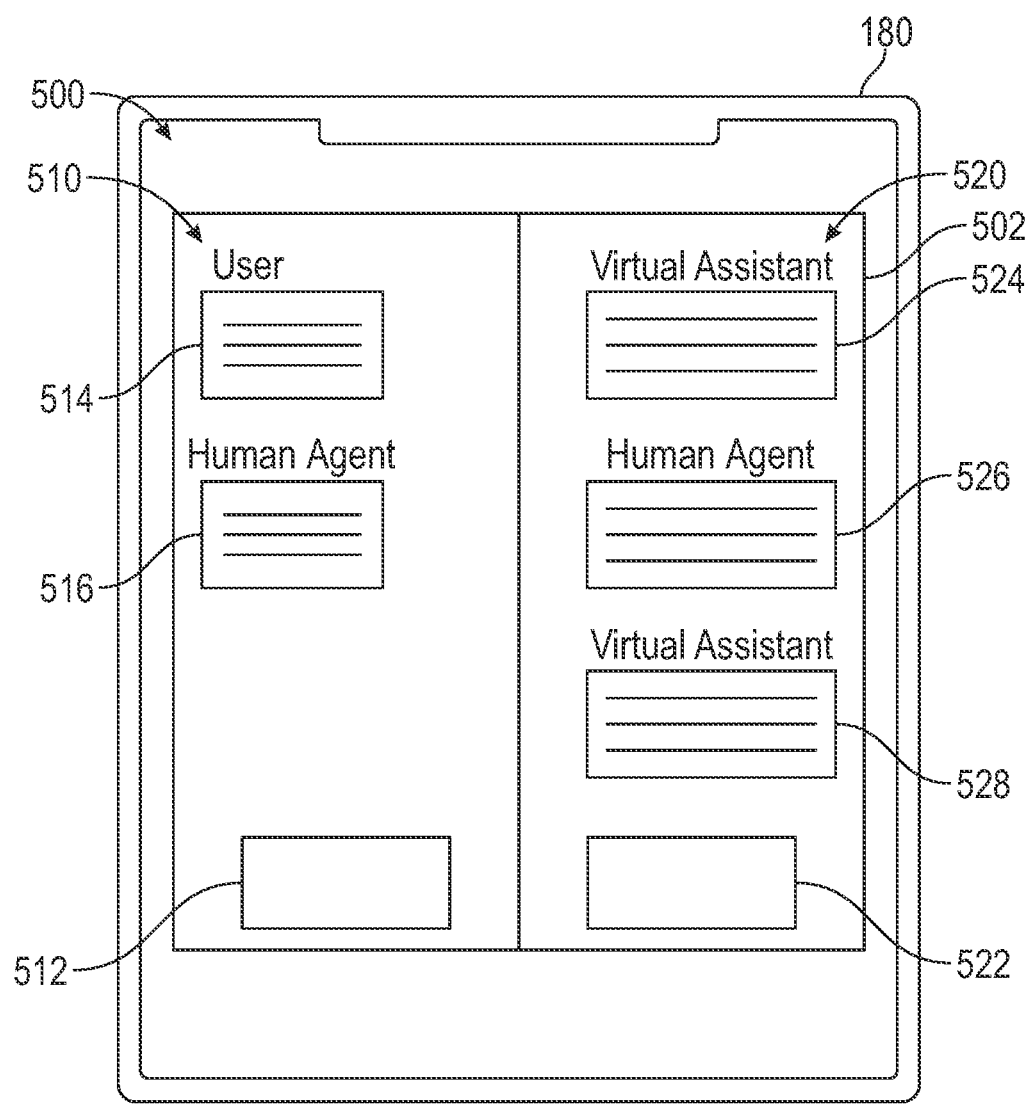
FIG. 8 is an illustration of a configuration of a user interface generated by the communication system of FIG. 1, according to example embodiments.

Referring now to FIG. 8, an illustration of a configuration of an agent interface 500 on the human agent device 180 is shown. The agent interface 500 may be presented within the agent application 194. In some embodiments, the agent interface 500 is generated and provided by the content control circuit 128 and transmitted to the human agent device 180 to be displayed to a human agent. In some instances, the agent interface 500 is generated and provided to the human agent device 180 when the processing circuit 114 adds the human agent device 180 to the conversation (e.g., when the processing circuit 114 is unauthorized to autonomously perform the second task associated with the second input received from the user device 140 during the conversation, etc.).

As illustrated, the agent interface includes an application interface 502, a conversation interface 510, a conversation actionable item 512, an input element 514, a response element 516, a sidebar interface 520, a sidebar conversation actionable item 522, a prompt element 524, a query element 526, and a query response element 528. As illustrated, the application interface 502 may be a window included in the agent interface 500. The application interface 502 may display a conversation between a user, a virtual assistant executed by the processing circuit 114, and a human agent on a GUI of the human agent device 180 associated with the human agent such that the human agent may be provided with the conversation between the user, the virtual assistant, and the human agent. The application interface 502 may also display a sidebar conversation (e.g., a side conversation, a query conversation, etc.) between the virtual assistant executed by the processing circuit 114 and the human agent on the GUI of the human agent device 180 such that the human agent may be provided with the sidebar conversation between the virtual assistant and the human agent. In some instances, the application interface 502 may only be displayed in a portion of the agent interface 500. In other instances, the application interface 502 is displayed across an entirety of the agent interface 500.

The conversation interface 510 may display the conversation between the user, the virtual assistant, and the human agent on the GUI of the human agent device 180. The conversation interface may include any of the inputs or the responses included in the conversation (e.g., the first input, the first response, the second input, the second response, the third input, the third response, etc.). The conversation actionable item 512 may indicate a portion of the conversation interface 510 where the human agent of the human agent device 180 may enter inputs associated with the human agent during the conversation with the user and the virtual assistant. As illustrated, the conversation actionable item 512 is a text box where the human agent may enter text to create the inputs during the conversation. For example, the human agent may select the conversation actionable item 512 and may type words or phrases on a keyboard communicably coupled to the human agent device 180 to create the responses provided by the human agent during the conversation. As another example, the human agent may select the conversation actionable item 512 and may speak a message that is provided to the human agent device 180 to create the responses provided by the human agent during the conversation.

The input element 514 may indicate an input associated with the user during the conversation with the virtual assistant executed by the processing circuit 114. As illustrated, the input element 514 is a text box that corresponds with the input associated with the user during the conversation with the virtual assistant. In some instances, the input element 514 may include figures indicating the input associated with the user, elements indicating the input associated with the user, etc. In some instances, the input element 514 corresponds with a task that the processing circuit 114 executing the virtual assistant is unauthorized to autonomously perform.

The response element 516 may indicate a response provided by the human agent of the human agent device 180 based on the input associated with the input element 514 when the input is associated with the task that the processing circuit 114 is unauthorized to autonomously perform. For example, after the processing circuit 114 generates a message parameter associated with the input that corresponds with the task that the processing circuit 114 is unauthorized to perform, the processing circuit 114 may add the human agent device 180 associated with the human agent to the conversation so that the human agent can perform the task and provide the response associated with the response element 516. As illustrated, the response element 516 is a text box that corresponds with the response based on the input associated with the input element 514. In some instances, the response element 516 may include figures indicated the second response based on the input associated with the input element 514. In some instances, the response element 516 may be related to the task performed by the human agent of the human agent device 180.

The sidebar interface 520 may display the sidebar conversation between the virtual assistant and the human agent on the GUI of the human agent device 180. The sidebar conversation may be associated with the conversation between the user, the virtual assistant, and the human agent displayed by the conversation interface 510. The query interface may include any of the prompts, the queries, or the query responses that occur between the processing circuit 114 and the human agent. The sidebar conversation actionable item 522 may indicate a portion of the sidebar interface 520 where the human agent of the human agent device 180 may enter inputs associated with the human agent during the sidebar conversation with the virtual assistant. As illustrated, the sidebar conversation actionable item 522 is a text box where the human agent may enter text to create the inputs during the sidebar conversation. For example, the human agent may select the sidebar conversation actionable item 522 and may type words or phrases on a keyboard communicably coupled to the human agent device 180 to create the queries provided to the processing circuit 114 during the sidebar conversation. As another example, the human agent may select the sidebar conversation actionable item 522 and may speak a message that is provided to the human agent device 180 to create the queries provided to the processing circuit 114 during the sidebar conversation.

The prompt element 524 may indicate a prompt provided by the processing circuit 114 to the human agent device 180 based on the input associated with the input element 514 when the input is associated with the task that the processing circuit 114 is unauthorized to autonomously perform. The prompt element 524 may indicate how the processing circuit 114 would autonomously perform the task based on the input. As illustrated, the prompt element 524 is a text box that corresponds with the prompt generated by the processing circuit 114 based on the input associated with the input element 514.

The query element 526 may indicate a query provided by the human agent of the human agent device 180 to the processing circuit 114 associated with the input associated with the input element 514. The query of the query element 526 may be based on a question that the human agent has relating to the input associated with the input element 514. As illustrated, the query element 526 is a text box that corresponds with the query based on the input associated with the input element 514.

The query response element 528 may indicate a query response to the query associated with the input associated with the input element 514. The query response may be generated by the processing circuit 114 in response to the query. As illustrated, the query response element 528 is a text box that corresponds with the query response to the query associated with the query element 526.

It should be understood that no claim element herein is to be construed under the provisions of 35 U.S.C. § 112 (f) unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory).

Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the smart table system may be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A system comprising:
   a processing circuit comprising memory and one or more processors, the processing circuit configured to:

receive a first input from a user device associated with a user during a conversation;

model the first input to generate a first message parameter associated with the first input, wherein the first message parameter corresponds with a first task that the processing circuit is authorized to autonomously perform;

autonomously perform the first task based on the first input;

generate and provide, to the user device, a first response based on the first input;

receive a second input from the user device during the conversation;

model the second input to generate a second message parameter associated with the second input, wherein the second message parameter corresponds with a second task that the processing circuit is unauthorized to autonomously perform;

add a human agent device associated with a human agent to the conversation to provide a second response based on the second input and to perform the second task;

receive a third input from the user device during the conversation;

model the third input to generate a third message parameter associated with the third input, wherein the third message parameter corresponds with a third task that the processing circuit is authorized to autonomously perform;

autonomously perform the third task based on the third input; and generate and provide, to the user device, a third response based on the third input.

2. The system of claim 1, wherein the first task and the third task are low authority tasks and the second task is a high authority task.

3. The system of claim 1, wherein the processing circuit is unauthorized to autonomously perform the second task based on a sentiment score of the second input being above a sentiment threshold, wherein the sentiment score is related to a tone associated with the second input.

4. The system of claim 1, wherein prior to adding the human agent device, the processing circuit is further configured to:

generate and provide, to the human agent device, a prompt based on the second input, wherein the prompt indicates how the processing circuit would autonomously perform the second task based on the second input if authorized to do so.

5. The system of claim 4, wherein the processing circuit is further configured to:

receive, from the human agent device, a query associated with the second input; and generate and provide, to the human agent device, a response to the query associated with the second input.

6. The system of claim 4, wherein the prompt further comprises a summary of the first task.

7. The system of claim 1, wherein prior to adding the human agent device associated with the human agent to the conversation to provide the second response based on the second input and to perform the second task, the processing circuit is further configured to:

generate and provide, to the user device, a first notification alerting the user that the second response is received from the human agent.

8. The system of claim 7, wherein prior to generating and providing the third response based on the third input, the processing circuit is further configured to:

generate and provide, to the user device, a second notification alerting the user that contents of the third response is generated by the processing circuit.

9. The system of claim 1, wherein the processing circuit is further configured to:

generate and provide, to the user device, a summary of the first task, the second task, and the third task, wherein the summary is based on the first response, the second response, and the third response.

10. A method comprising:

receiving, by a processing circuit, a first input from a user device associated with a user during a conversation;

modeling the first input to generate a first message parameter associated with the first input, wherein the first message parameter corresponds with a first task that the processing circuit is authorized to autonomously perform;

autonomously performing the first task based on the first input;

generating and providing, to the user device, a first response based on the first input;

receiving a second input from the user device during the conversation;

modeling the second input to generate a second message parameter associated with the second input, wherein the second message parameter corresponds with a second task that the processing circuit is unauthorized to autonomously perform;

adding a human agent device associated with a human agent to the conversation to provide a second response based on the second input and to perform the second task;

receiving a third input from the user device during the conversation;

modeling the third input to generate a third message parameter associated with the third input, wherein the third message parameter corresponds with a third task that the processing circuit is authorized to autonomously perform;

autonomously performing the third task based on the third input; and generating and providing, to the user device, a third response based on the third input.

11. The method of claim 10, wherein the first task and the third task are low authority tasks and the second task is a high authority task.

12. The method of claim 11, wherein the processing circuit is unauthorized to autonomously perform the second task based on a sentiment score of the second input being above a sentiment threshold, wherein the sentiment score is related to a tone associated with the second input.

13. The method of claim 10, wherein prior to adding the human agent device, the method further comprises:

generating and providing, to the human agent device, a prompt based on the second input, wherein the prompt indicates how the processing circuit would autonomously perform the second task based on the second input if authorized to do so.

14. The method of claim 10, wherein the method further comprises:

receiving, from the human agent device, a query associated with the second input; and generating and providing, to the human agent device, a response to the query associated with the second input.

15. The method of claim 10, wherein prior to adding the human agent device associated with the human agent to the conversation to provide the second response based on the second input and to perform the second task, the method further comprises:
    generating and providing, to the user device, a first notification alerting the user that the second response is received from the human agent.

16. The method of claim 10, wherein the method further comprises:
    generating and providing, to the user device, a summary of the first task, the second task, and the third task, wherein the summary is based on the first response, the second response, and the third response.

17. A non-transitory computer-readable storage medium having instructions stored thereon that, when executed by a processing circuit, cause the processing circuit to perform operations comprising:
    receiving a first input from a user device associated with a user during a conversation;
    modeling the first input to generate a first message parameter associated with the first input, wherein the first message parameter corresponds with a first task that the processing circuit is authorized to autonomously perform;
    autonomously performing the first task based on the first input;
    generating and providing, to the user device, a first response based on the first input;
    receiving a second input from the user device during the conversation;
    modeling the second input to generate a second message parameter associated with the second input, wherein the second message parameter corresponds with a second task that the processing circuit is unauthorized to autonomously perform;
    adding a human agent device associated with a human agent to the conversation to provide a second response based on the second input and to perform the second task;
    receiving a third input from the user device during the conversation;
    modeling the third input to generate a third message parameter associated with the third input, wherein the third message parameter corresponds with a third task that the processing circuit is authorized to autonomously perform;
    autonomously performing the third task based on the third input; and
    generating and providing, to the user device, a third response based on the third input.

18. The non-transitory computer-readable storage medium of claim 17, wherein the processing circuit is unauthorized to autonomously perform the second task based on a sentiment score of the second input being above a sentiment threshold, wherein the sentiment score is related to a tone associated with the second input.

19. The non-transitory computer-readable storage medium of claim 17, wherein the operations further comprise:
    receiving, from the human agent device, a query associated with the second input; and
    generating and providing, to the human agent device, a response to the query associated with the second input.

20. The non-transitory computer-readable storage medium of claim 17, wherein the operations further comprise:
    generating and providing, to the user device, a summary of the first task, the second task, and the third task, wherein the summary is based on the first response, the second response, and the third response.

* * * * *